(12) United States Patent
Yamaoka et al.

(10) Patent No.: US 7,196,994 B2
(45) Date of Patent: Mar. 27, 2007

(54) INFORMATION RECORDING MEDIUM, INFORMATION RECORDING APPARATUS AND INFORMATION REPRODUCTION APPARATUS FOR THE SAME

(75) Inventors: Masaru Yamaoka, Osaka (JP); Takashi Yumiba, Kyotanabe (JP); Takahiro Nagai, Osaka (JP); Hideshi Ishihara, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 95 days.

(21) Appl. No.: 10/531,810

(22) PCT Filed: Jun. 2, 2003

(86) PCT No.: PCT/JP03/06965

§ 371 (c)(1),
(2), (4) Date: Apr. 18, 2005

(87) PCT Pub. No.: WO2004/036560

PCT Pub. Date: Apr. 29, 2004

(65) Prior Publication Data

US 2006/0031868 A1      Feb. 9, 2006

(30) Foreign Application Priority Data

Oct. 18, 2002    (JP)    ............................. 2002-304792

(51) Int. Cl.
*G11B 5/09* (2006.01)
(52) U.S. Cl. ................. 369/53.21; 369/47.12; 369/47.21; 369/59.23

(58) Field of Classification Search ..................... None
See application file for complete search history.

(56) References Cited

U.S. PATENT DOCUMENTS

| 5,661,703 A | 8/1997 | Moribe et al. |
| 2006/0039262 A1* | 2/2006 | Nagai et al. .............. 369/59.25 |

FOREIGN PATENT DOCUMENTS

| EP | 1 058 254 | 12/2000 |
| JP | 11-102572 | 4/1999 |
| JP | 2001-77802 | 3/2001 |
| JP | 2001-357533 | 12/2001 |
| WO | WO 02/25645 | 3/2002 |

\* cited by examiner

*Primary Examiner*—Muhammad Edun
(74) *Attorney, Agent, or Firm*—Hamre, Schumann, Mueller & Larson, P.C.

(57) ABSTRACT

An optical disk is provided that disables reproduction of sub-information even if the sub-information as a contents encryption key is recorded entirely onto another optical disk. Sub-information is recorded on the optical disk by deforming a recording mark slightly in accordance with a pseudo random number sequence that is obtained using as an initial value medium ID that is read out medium inherent information. This allows sub-information inherent in a medium to be recorded, and even if the sub-information is duplicated entirely to another optical disk, the illegally duplicated sub-information cannot be reproduced because of a difference in initial value of a pseudo random number sequence between media.

19 Claims, 20 Drawing Sheets

INFORMATION RECORDING MEDIUM, INFORMATION RECORDING APPARATUS AND INFORMATION REPRODUCTION APPARATUS FOR THE SAME

TECHNICAL FIELD

The present invention relates to an information recording medium, and information recording apparatus and information reproducing apparatus for the information recording medium. Specifically, this invention relates to a technique of recording sub-information as a contents encryption key on an information recording medium so that the sub-information is superimposed on main information and reproducing the sub-information recorded on the information recording medium.

BACKGROUND ART

Optical disks typified by a DVD-RAM have become widespread as information recording media on which massive amounts of digital data such as AV (Audio Video) data, computer data and the like can be recorded. In order to secure the sound distribution of digital works recorded on such information recording media, there is a demand for a technique that prevents digital works on an information recording medium from being duplicated illegally to another information recording medium.

One conventional technique for preventing illegal duplication is such that in accordance with a pseudo random number sequence that is generated inside a given apparatus, an edge in a tangential direction of a recording mark to be recorded on an optical disk is displaced to a position advanced or delayed by a constant slight amount, thus recording sub-information. Such a technique is proposed as a method of recording key information, as sub-information, for decoding encrypted contents recorded on an optical disk (see, for example, JP2001-357533 A).

FIG. 23 is a circuit block diagram schematically showing a configuration of a conventional information recording apparatus that records sub-information by displacing an edge in a tangential direction of a recording mark by a constant slight amount.

In FIG. 23, upon receipt of an initialization timing signal (INIT) from a main information recording part (not shown), which indicates a timing for recording sub-information, a pseudo random number generator 2301 initializes a pseudo random number sequence using an initial value 2302 that has been stored in advance secretly inside an apparatus, generates a pseudo random number sequence (PRS) in synchronization with a byte clock from the main information recording part (not shown), and outputs it to an exclusive OR circuit (XOR) 2303.

The XOR 2303 performs an exclusive OR operation of sub-information (contents encryption key) (SI) to be recorded and the pseudo random number sequence from the pseudo random number generator 2301 so as to output a sub-information recording control signal (SIW) to a phase encoding (PE) modulator 2304.

In the PE modulator 2304, the sub-information recording control signal SIW outputted from the XOR 2303 is subjected to PE modulation so as to generate a phase modulation control signal (PMC), and the phase modulation control signal (PMC) is transmitted to a recording channel. Based on this phase modulation control signal PMC, modulation is performed in which an edge of a recording signal for recording main information is advanced or delayed, and thus the contents encryption key is recorded as sub-information.

Furthermore, in an information reproducing apparatus, sub-information is reproduced based on a correlation of a phase error signal obtained as a result of detecting whether an edge of a reproduced signal of main information is advanced or delayed with a pseudo random number sequence generated based on an initial value that is the same as used in the case of the information recording apparatus.

In the above-described technique, since sub-information (contents encryption key) is superimposed as jitter of a reproduced signal, unless an accurate pseudo random number sequence can be generated, it is impossible to record or reproduce sub-information appropriately. This allows digital works recorded on an optical disk to be protected from illegal duplication.

However, in this technique, it is required that all apparatuses use a standardized pseudo random number generator and an initial value thereof Because of this, particularly, once the initial value is publicized, proof of every illegal duplication might be lost. Thus, the initial value should be managed strictly.

Furthermore, in considering such information recording/reproducing apparatuses that record and reproduce main information and sub-information, once an area in which sub-information is recorded is revealed, it hardly can be said that there is sufficient proof of an act of recording encrypted contents and an encryption key of the encrypted contents recorded as sub-information entirely onto another optical disk.

DISCLOSURE OF THE INVENTION

With the foregoing in mind, it is an object of the present invention to provide an information recording medium that disables reproduction of sub-information even if the sub-information as a contents encryption key is recorded entirely onto another information recording medium, or nullifies recording and reproduction of sub-information by an apparatus if an initial value is publicized in the apparatus, and to provide an information recording apparatus and an information reproducing apparatus with respect to the information recording medium.

In order to achieve the above-mentioned object, a first information recording medium according to the present invention is an information recording medium in which a recording mark is formed as main information by switching a signal level at a predetermined interval of a reference signal and that has the following configuration. That is, in the information recording medium, sub-information is recorded by deformation of a shape or a pattern of the recording mark (for example, displacement of a recording mark edge in a tangential direction) or positional displacement of the recording mark (for example, displacement of the recording mark itself in a radial direction) based on the sub-information and medium inherent information of the information recording medium.

According to this configuration, even if in addition to main information, sub-information itself also is duplicated entirely to another information recording medium, the duplicated sub-information cannot be reproduced using a pseudo random number sequence inherent in the other information recording medium.

In order to achieve the above-mentioned object, a second information recording medium according to the present invention is an information recording medium in which a recording mark is formed as main information by switching a signal level at a predetermined interval of a reference signal and that has the following configuration. That is, in the information recording medium, sub-information is recorded by deformation of a shape or a pattern of the recording mark (for example, displacement of a recording mark edge in a tangential direction) or positional displacement of the recording mark (for example, displacement of the recording mark itself in a radial direction) based on the sub-information and apparatus nullification information for nullifying recording and reproduction of the main information recorded on the information recording medium. In this case, the apparatus nullification information is an encryption key set that encrypts the main information of the information recording medium.

According to this configuration, for example, in the case where sub-information recorded on an information recording medium is duplicated illegally by tampering with or alteration to an apparatus, recording and reproduction of the sub-information by such an illegal apparatus can be nullified.

In order to achieve the above-mentioned object, a third information recording medium according to the present invention is an information recording medium in which a recording mark is formed as main information by switching a signal level at a predetermined interval of a reference signal and that has the following configuration. That is, in the information recording medium, sub-information is recorded by deformation of a shape or a pattern of the recording mark (for example, displacement of a recording mark edge in a tangential direction) or positional displacement of the recording mark (for example, displacement of the recording mark itself in a radial direction) based on the sub-information and apparatus inherent information of an apparatus that has recorded the main information on the information recording medium.

According to this configuration, apparatuses other than an apparatus that has performed recording with respect to an information recording medium cannot reproduce sub-information from the information recording medium.

In order to achieve the above-mentioned object, a first information recording apparatus according to the present invention has a configuration including: a main information recording unit that records, in synchronization with a predetermined reference signal, main information by forming a recording mark at discrete reference positions on an information recording medium; a random number sequence generating unit that reads out medium inherent information of the information recording medium and generates a pseudo random number sequence related to the medium inherent information; and a sub-information recording unit that records sub-information so that the sub-information is superimposed on the main information by deformation of a shape or a pattern of the recording mark (for example, displacement of a recording mark edge in a tangential direction) or positional displacement of the recording mark (for example, displacement of the recording mark itself in a radial direction) based on the sub-information and the pseudo random number sequence generated by the random number sequence generating unit.

According to this configuration, it is possible to record sub-information that cannot be reproduced using a pseudo random number sequence inherent in another medium even if in addition to main information, the sub-information itself also is duplicated entirely to the another medium.

In order to achieve the above-mentioned object, a second information recording apparatus according to the present invention has a configuration including: a main information recording unit that records, in synchronization with a predetermined reference signal, main information by forming a recording mark at discrete reference positions on an information recording medium; a random number sequence generating unit that generates a pseudo random number sequence related to apparatus nullification information that is recorded on the information recording medium; and a sub-information recording unit that records sub-information so that the sub-information is superimposed on the main information by deformation of a shape or a pattern of the recording mark for example, displacement of a recording mark edge in a tangential direction) or positional displacement of the recording mark (for example, displacement of the recording mark itself in a radial direction) based on the sub-information and the pseudo random number sequence generated by the random number sequence generating unit.

According to this configuration, it is possible to record sub-information that can nullify recording and reproduction of the sub-information with respect to an apparatus that is used illegally by illegal tampering and alteration.

In order to achieve the above-mentioned object, a third information recording apparatus according to the present invention has a configuration including: a main information recording unit that records, in synchronization with a predetermined reference signal, main information by forming a recording mark at discrete reference positions on an information recording medium; a random number sequence generating unit that generates a pseudo random number sequence related to apparatus inherent information that is contained individually in each apparatus; and a sub-information recording unit that records sub-information so that the sub-information is superimposed on the main information by deformation of a shape or a pattern of the recording mark for example, displacement of an edge in a tangential direction of the recording mark) or positional displacement of the recording mark (for example, displacement of the recording mark in a radial direction) based on the sub-information and the pseudo random number sequence generated by the random number sequence generating unit.

According to this configuration, it is possible to record sub-information that cannot be reproduced by apparatuses other than an apparatus that has performed recording with respect to an information recording medium.

Furthermore, the second information recording apparatus has a configuration including an apparatus nullification processing unit that generates an encryption key for encrypting the main information by decoding the encrypted apparatus nullification information that is recorded on the information recording medium using apparatus inherent information of an apparatus that performs recording with respect to the information recording medium.

According to this configuration, even with the advent of an apparatus that rewrites sub-information illegally by tampering or the like, by updating from then on an encryption medium key bundle that is apparatus nullification information of each medium being distributed, it is possible to nullify recording of the sub-information on a medium having the updated encryption medium key bundle.

In order to achieve the above-mentioned object, a first information reproducing apparatus according to the present invention has a configuration including: a main information reproducing unit that reproduces main information from a recorded mark having a length that is an integral multiple of a discrete reference interval on an information recording medium; a dock extracting unit that extracts a dock that is synchronized with the reference interval from a reproduced signal obtained when the recorded mark is reproduced; a random number sequence generating unit that reads out medium inherent information of the information recording medium and generates a pseudo random number sequence related to the medium inherent information; and a sub-information reproducing unit that reproduces sub-information based on the reproduced signal reproduced by the main information reproducing unit, the dock extracted by the dock extracting unit, and the pseudo random number sequence generated by the random number sequence generating unit.

According to this configuration, it is possible to realize an information reproducing apparatus that cannot reproduce sub-information of an illegally duplicated medium.

In order to achieve the above-mentioned object, a second information reproducing apparatus according to the present invention has a configuration including: a main information reproducing unit that reproduces main information from a recorded mark having a length that is an integral multiple of a discrete reference interval on an information recording medium; a dock extracting unit that extracts a dock that is synchronized with the reference interval from a reproduced signal obtained when the recorded mark is reproduced; a random number sequence generating unit that generates a pseudo random number sequence related to apparatus nullification information recorded on the information recording medium; and a sub-information reproducing unit that reproduces sub-information based on the reproduced signal reproduced by the main information reproducing unit, the dock extracted by the dock extracting unit, and the pseudo random number sequence generated by the random number sequence generating unit.

According to this configuration, it is possible to realize an information reproducing apparatus that disables reproduction of sub-information by a nullified apparatus.

In order to achieve the above-mentioned object, a third information reproducing apparatus according to the present invention has a configuration including: a main information reproducing unit that reproduces main information from a recorded mark having a length that is an integral multiple of a discrete reference interval on an information recording medium; a dock extracting unit that extracts a dock that is synchronized with the reference interval from a reproduced signal obtained when the recorded mark is reproduced; a random number sequence generating unit that generates a pseudo random number sequence related to medium inherent information that is contained individually in each apparatus; and a sub-information reproducing unit that reproduces sub-information based on the reproduced signal reproduced by the main information reproducing unit, the dock extracted by the dock extracting unit, and the pseudo random number sequence generated by the random number sequence generating unit.

According to this configuration, it is possible to realize an information reproducing apparatus that allows sub-information to be reproduced only by an apparatus that has performed recording with respect to an information recording medium.

Furthermore, the second information reproducing apparatus has a configuration including an apparatus nullification processing unit that generates a decoding key for decoding the main information by decoding the encrypted apparatus nullification information that is recorded on the information recording medium using apparatus inherent information of an apparatus that performs reproduction with respect to the information recording medium.

According to this configuration, even with the advent of an apparatus that rewrites sub-information illegally by tampering or the like, by updating from then on an encryption medium key bundle that is apparatus nullification information of each medium being distributed, it is possible to nullify reproduction of the sub-information from a medium having the updated encryption medium key bundle.

BEST MODE FOR CARRYING OUT THE INVENTION

Hereinafter, preferred embodiments of the present invention will be described by referring to the appended drawings. Each of the following embodiments describes the case where an optical disk is used as an information recording medium, and an information recording apparatus and an information reproducing apparatus are an optical disk recording apparatus and an optical disk reproducing apparatus, respectively.

(Embodiment 1)

Figure 1:
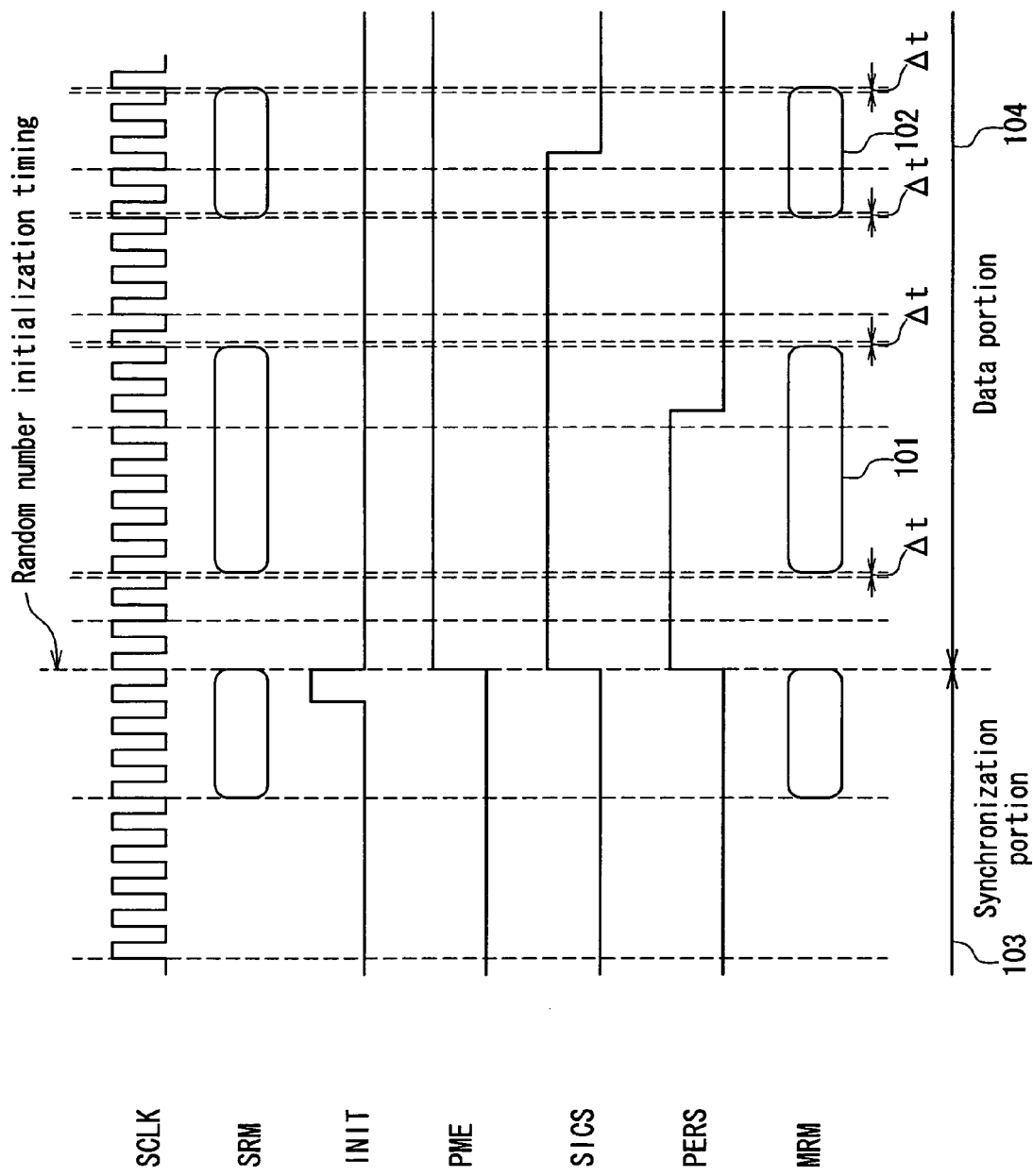
FIG. 1 is a timing chart schematically showing a state in which a recording mark containing sub-information is formed on an optical disk as an information recording medium according to Embodiment 1 of the present invention.

FIG. 1 is a timing chart schematically showing a state in which a recording mark containing sub-information is formed on an optical disk as an information recording medium according to Embodiment 1 of the present invention.

Disk inherent identification information as information inherent in a medium has been recorded in advance on the optical disk according to this embodiment. On the optical disk, not only is main information recorded by formation of an optically readable recording mark but also at the same time, watermark information is recorded as sub-information while being embedded in the main information by phase modulation in which edges in a tangential direction of recording marks 101 and 102 to be formed in a data portion 104 other than a synchronization portion 103 are advanced or delayed in phase by Δt.

FIG. 1 shows an optical disk in which, with respect to an edge in the tangential direction of a standard recording mark (SRM) synchronized with a synchronization clock (SCLK) constituting main information, sub-information is recorded only in a section that indicates the data portion 104 in which the sub-information is to be embedded and in which a phase modulation enabling signal (PME) is at a logic "H" level. At a timing indicated by a random number initialization timing signal (INIT), the sub-information is related to a sub-information correlation random number sequence (SICS) (for example, exclusive OR is performed) that is initialized using a value calculated from disk inherent identification information of a medium with respect to which recording is to be performed. Moreover, based on a post-PE modulation random number sequence (PERS) obtained as a result of PE modulation performed so that an edge in the tangential direction is advanced or delayed in phase by a byte unit substantially uniformly, an edge of a recording mark of the main information is phase-modulated in the tangential direction, and thus a modulated recording mark (MRM) is recorded.

The description is directed next to a recording apparatus with respect to an optical disk on which, in accordance with a pseudo random number sequence generated using disk inherent identification information as an initial value, sub-information is recorded so that the sub-information is superimposed on main information. The optical disk recording apparatus according to this embodiment is an apparatus that records main information and sub-information on an optical disk.

Figure 2:
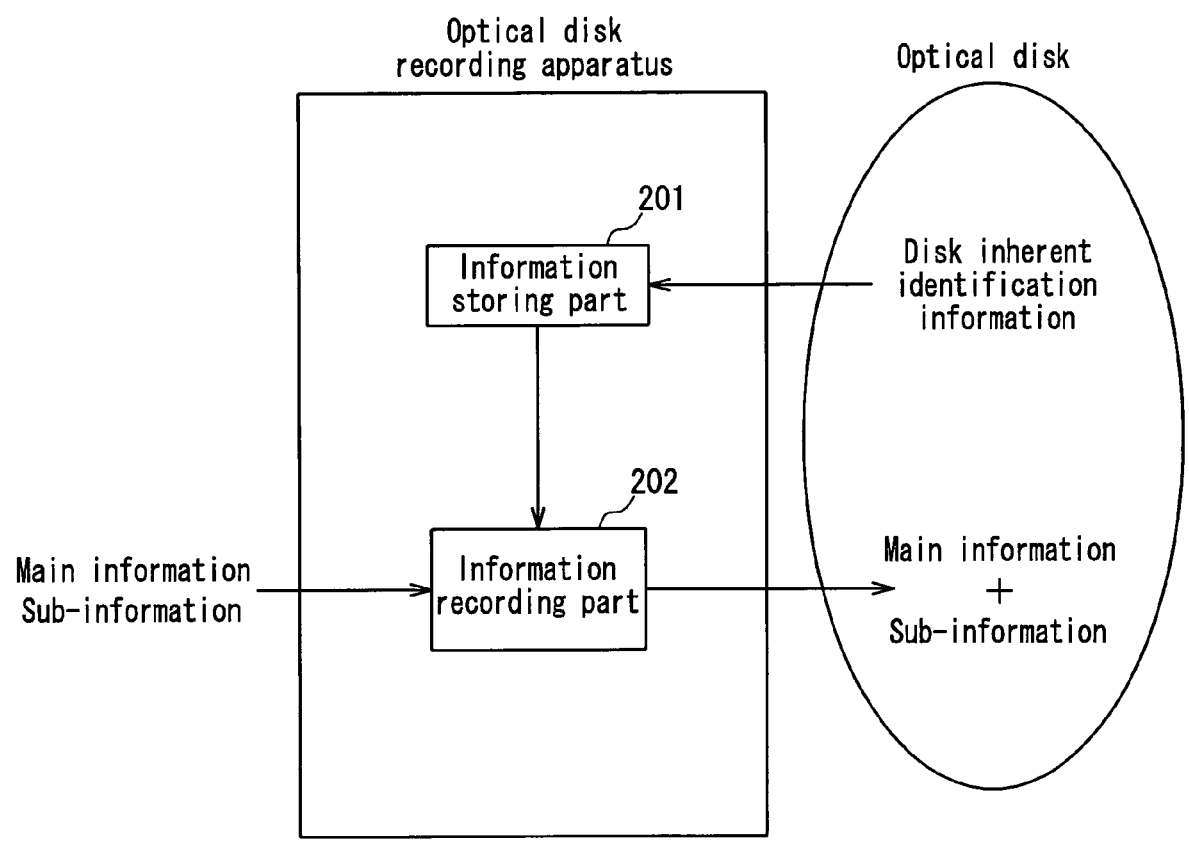
FIG. 2 is a conceptual diagram showing a signal connection relationship between the optical disk as the information recording medium and an optical disk recording apparatus as an information recording apparatus according to Embodiment 1 of the present invention.

FIG. 2 is a conceptual diagram showing a signal connection relationship between the optical disk and the optical disk recording apparatus according to this embodiment.

Figure 22:
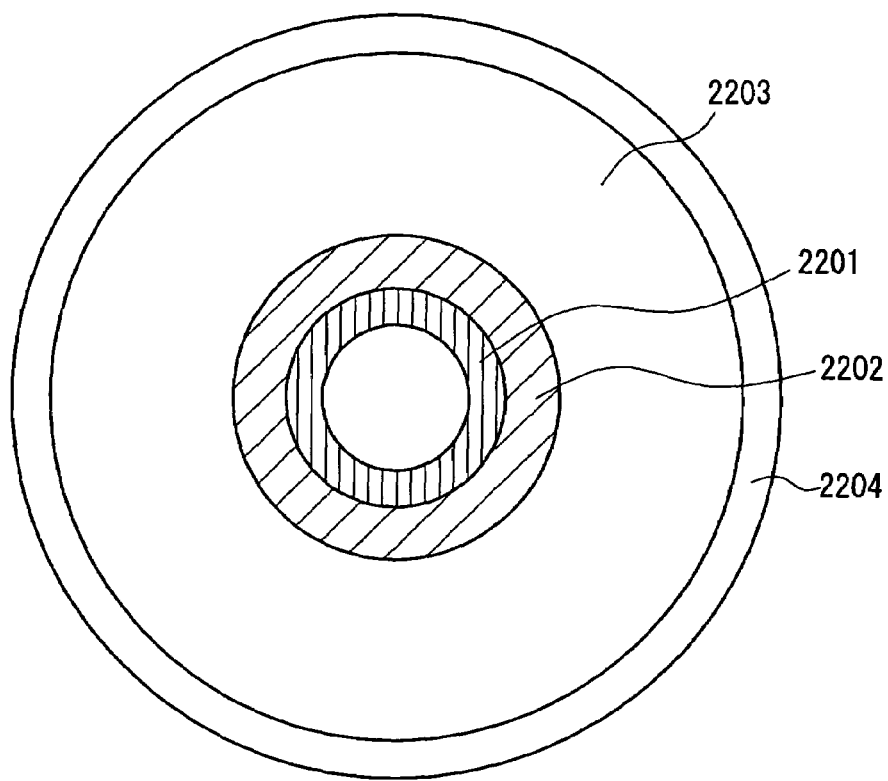
FIG. 22 is a schematic plan view showing areas in which disk inherent identification information as medium inherent information and an encryption medium key bundle as apparatus nullification information have been recorded in advance, respectively, on each of the optical disks according to the embodiments of the present invention.
Figure 23:
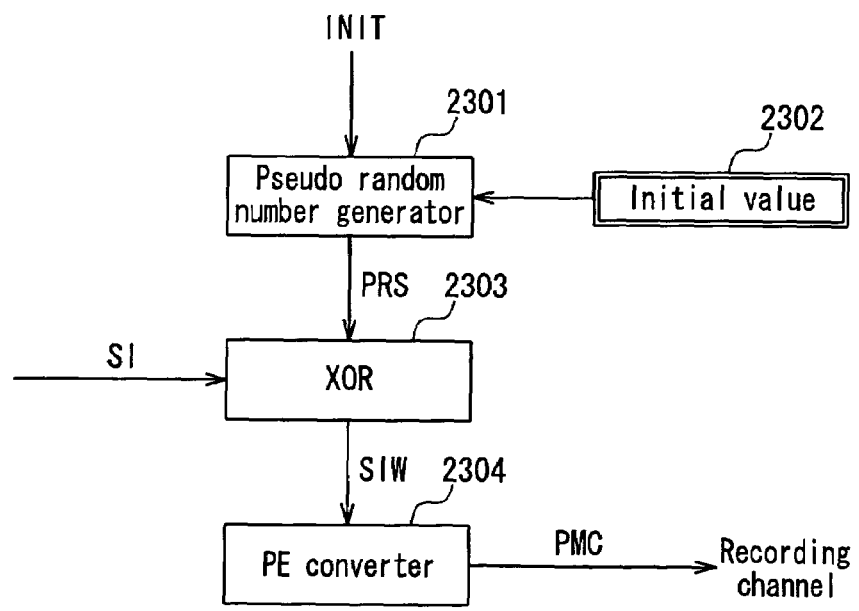
FIG. 23 is a circuit block diagram schematically showing a configuration of a conventional information recording apparatus that records sub-information by displacing an edge in a tangential direction of a recording mark by a constant slight amount.

The optical disk recording apparatus according to this embodiment reads out from an optical disk with respect to which recording is to be performed disk inherent identification information as medium inherent information that has been recorded in advance on the optical disk. This disk inherent identification information is inherent in each and every optical disk and as shown in FIG. 22, is recorded in a BCA (Burst Cutting Area) 2201 by an initializer using a laser whose output is higher than that used in the case of normal information recording. Therefore, without an initializer, general users cannot perform illegal tampering and duplication with respect to this disk inherent identification information that is the medium inherent information. Incidentally, in FIG. 22, reference numeral 2203 and 2204 denote a user area and an outer rim control area, respectively.

In FIG. 2, the optical disk recording apparatus is composed of an information storing part 201 that stores disk inherent identification information that has been read out in advance from the BCA and an information recording part 202 that records main information and sub-information using the disk inherent identification information that has been stored in advance in the information storing part 201.

Figure 3:
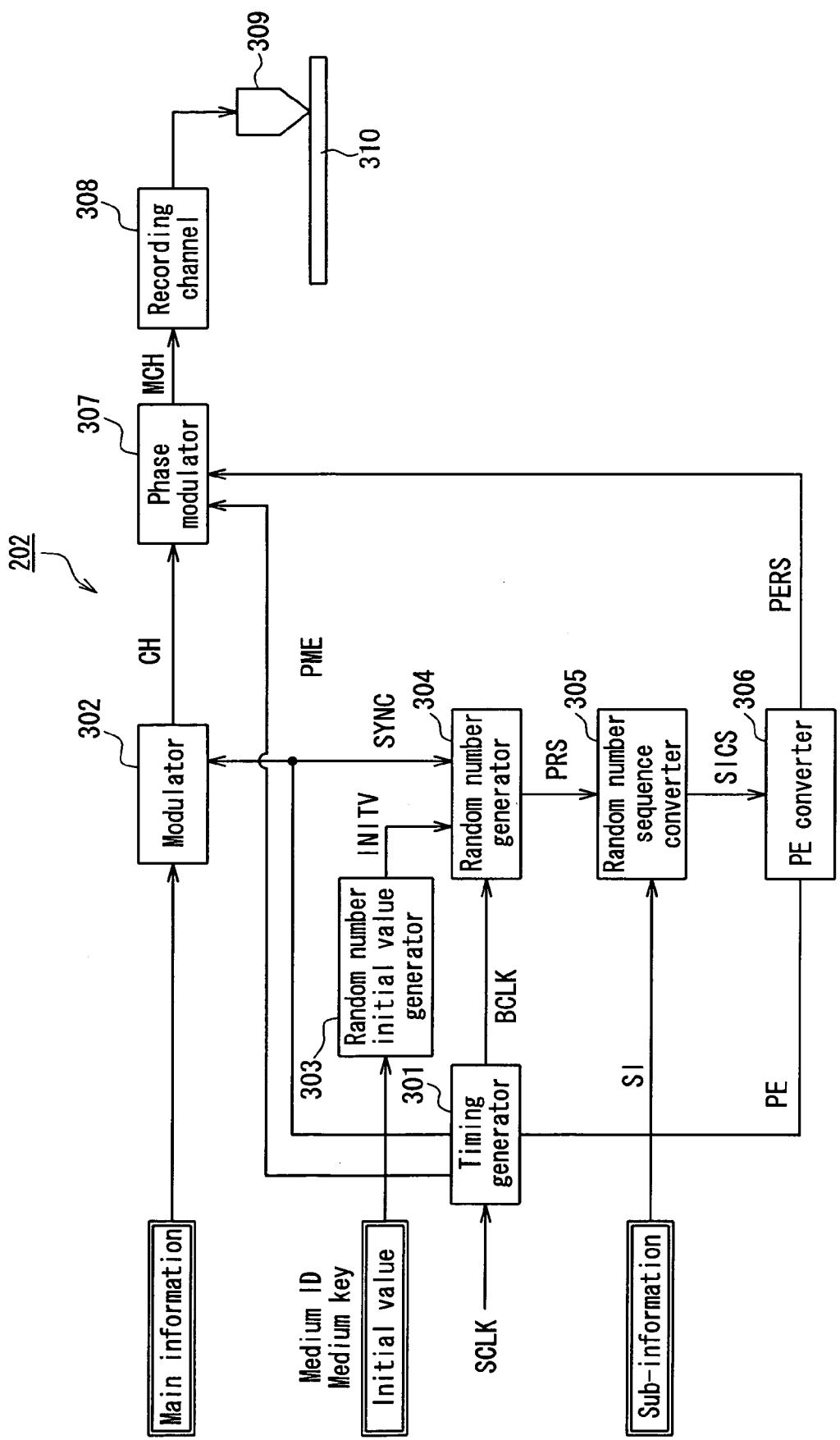
FIG. 3 is a block diagram mainly showing an example of a configuration of an information recording part 202 shown in FIG. 2.

FIG. 3 is a block diagram mainly showing an example of a configuration of the information recording part 202 shown in FIG. 2. In FIG. 3, the information recording part 202 is composed of a timing generator 301, a modulator 302, a random number initial value generator 303, a random number generator 304, a random number sequence converter 305, a PE (Phase Encoding) modulator 306, a phase modulator 307, a recording channel 308, and a recording head 309.

Receiving from a controller or the like, which is not shown, notification that recording of main information and sub-information is started, the timing generator 301 supplies the modulator 302 and the random number generator 304 with a synchronization signal (SYNC) indicating a timing for inserting a synchronization pattern (synchronization portion) in recording data. Further, based on this synchronization signal SYNC and a clock signal (SCLK), in synchronization with each byte of the recording data, the timing generator 301 outputs to the random number generator 304 a byte clock (BCLK) that is obtained by 16-frequency-division of the clock signal SCLK. The timing generator 301 further supplies the PE modulator 306 with a PE signal (PE) in which a logic "H" level section and a logic "L" level section are allocated equally with respect to each byte. Moreover, in order to record the main information and the sub-information, the timing generator 301 supplies the phase modulator 307 with a phase modulation enabling signal (PME) indicating a portion in which the sub-information is to be recorded (for example, a data portion of a frame without an ID portion).

Based on the synchronization signal SYNC from the timing generator 301, the modulator 302 inserts a synchronization pattern (synchronization portion) in inputted recording data (main information). The modulator 302 further converts each 8-bit length code (byte) of the main information to be recorded into a corresponding 16-bit length code and then converts the 16-bit length code into a NRZI (Non-Return-to-Zero Inverted) code so as to generate a channel signal (CH) and supplies it to the phase modulator 307.

Based on disk inherent identification information (Medium ID in FIG. 3) that has been read out in advance from an optical disk 310 and stored temporarily in the information storing part 202 (FIG. 2) prior to information recording, the random number initial value generator 303 calculates an initial value for the random generator 304. In this embodiment, the random number initial value generator 303 has a configuration in which disk inherent identification information (64 bits) that has been stored temporarily by the information storing part 202 is outputted in an as-is state as an initial value (INITV) of a random number sequence.

The random umber generator 304 presets the initial value outputted from the random number initial value generator 303 at a timing of the synchronization signal SYNC from the timing generator 301 and generates 1 bit of a random number sequence (M sequence) at a timing of the byte clock BCLK.

Figure 4:
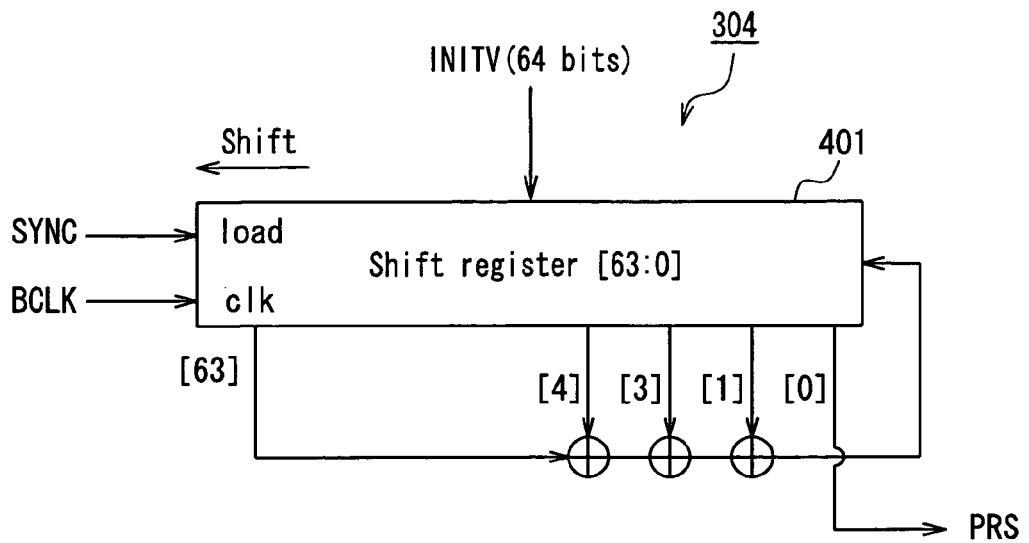
FIG. 4 is a circuit block diagram showing an example of an internal configuration of a random number generator 304 shown in FIG. 3.

FIG. 4 is a circuit diagram showing an example of an internal configuration of the random number generator 304. In FIG. 4, the random number generator 304 is a pseudo random number generator that generates (the $64^{th}$ power of 2−1) bit sequences in one cycle and is formed of a shift resister 401 with a bit length of 64 bits. The shift resistor 401 is shifted to the left by 1 bit at a timing of the byte clock BCLK, and an exclusive OR of the respective output values of a bit [63] (MSB), a bit [4], a bit [3], and a bit [1] is fed back to a bit [0] (LSB). The bit [0] (LSB) thus generated is supplied as a pseudo random number sequence (PRS) to the random number sequence converter 305.

Referring back to FIG. 3, the random number sequence converter 305 performs an operation for correlating each bit of sub information to be recorded with the pseudo random number sequence from the random number generator 304. In this embodiment, the random number sequence converter 305 is formed of an exclusive OR circuit. In accordance with each bit of the sub-information to be recorded, the random number sequence converter 305 performs inversion/non-inversion of the pseudo random number sequence PRS and supplies to the PE modulator 306 a resultant sequence as a sub-information correlation sequence (SICS). That is, the random number sequence converter 305 generates the sub-information correlation sequence SICS by updating a sub-information bit with respect to each predetermined area (3 frames in this embodiment) in which 1 bit of sub-information is to be recorded.

Based on the PE signal from the timing generator 301, the PE modulator 306 performs PE modulation (inversion after an exclusive OR) with respect to the sub-information correlation sequence SICS outputted from the random number sequence converter 305 and supplies to the phase modulator 307 a resultant sequence as a PE modulation random number sequence (PERS) of a sequence on which the sub-information is superimposed. As a result, the PE modulation random number sequence PERS falls in the middle of a channel signal CH in the case where the sequence on which the sub-information is superimposed is at the logic "L" level and rises in the middle of the channel signal in the case where the sequence on which the sub-information is superimposed is at the logic "H" level, and even in the case where the same random number sequences are provided continuously, the logic "L" level section and the logic "H" level section are allocated substantially equally.

The phase modulator 307 supplies the channel signal CH to the recording channel 308 in the following manner. That is, based on the PE modulation random number sequence PERS from the PE modulator 306, with respect only to a data portion of a frame, in which sub-information is to be recorded, of the channel signal CH from the modulator 302 (when the phase modulation enabling signal PME is at the logic "H" level), phase modulation is performed in which an edge in the tangential direction is delayed or advanced by a constant slight amount of time. On the other hand, with respect to portions other than the data portion (when the phase modulation enabling signal PME is at the logic "L" level), an edge in the tangential direction is not phase-modulated.

Figure 5:
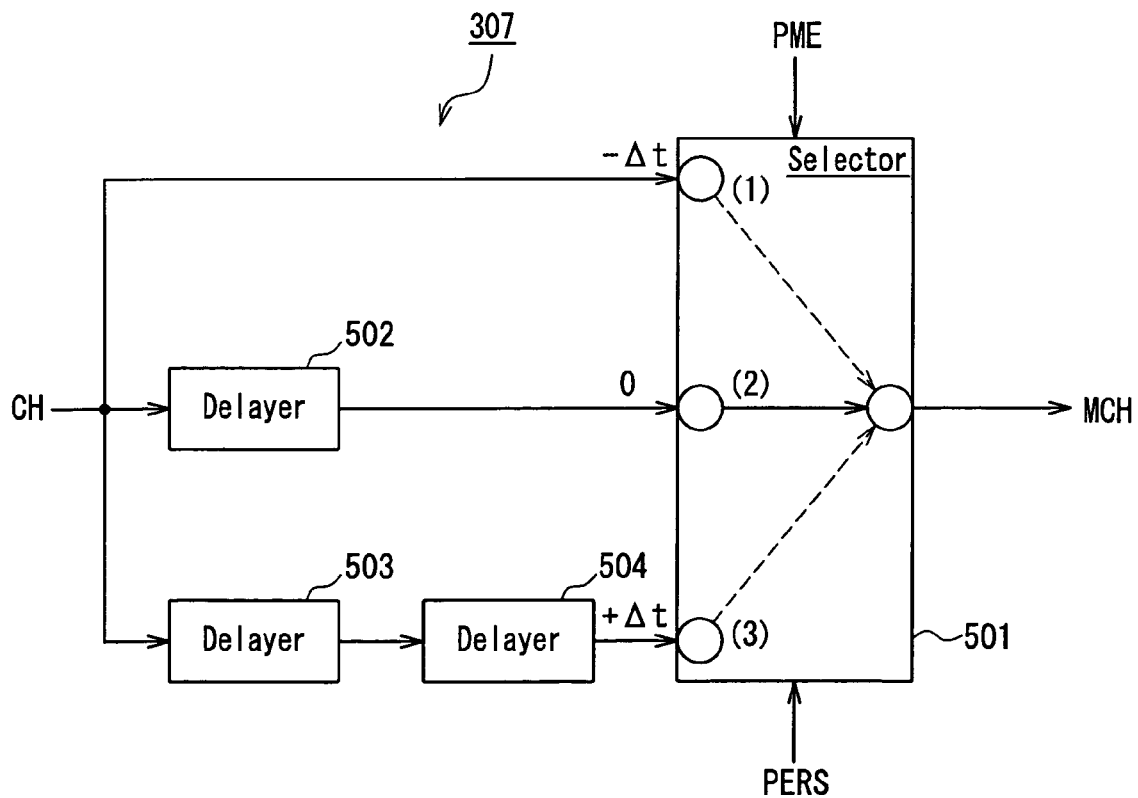
FIG. 5 is a circuit block diagram showing an example of an internal configuration of a phase modulator 307 shown in FIG. 3.

FIG. 5 is a circuit diagram showing an example of an internal configuration of the phase modulator 307. In FIG. 5, the phase modulator 307 is composed of delayers 502, 503, and 504 that delay signals by the above-mentioned slight amount of time and a selector 501 with three inputs and one output. In the case where the phase modulation enabling signal PME inputted as a control signal is at the logic "L" level, the selector 501 outputs a signal CH (2) (not changed in phase) obtained by delaying the channel signal CH from the modulator 302 at the delayer 502 in a first stage. Further, in the case where the phase modulation enabling signal PME is at the logic "H" level and the PE modulation random number sequence PERS is at the logic "H" level, the selector 501 outputs the channel signal CH from the modulator 302 in an as-is state as CH (1) (phase advance: −Δt). Further, in the case where the phase modulation enabling signal PME is at the logic "H" level and the PE modulation random number sequence PERS is a the logic "L" level, the selector 501 outputs a signal CH (3) (phase delay: +Δt) obtained by delaying the channel signal from the modulator 302 at the delayers (503 and 504) in a second stage.

As a result, with respect to a frame on which sub-information is not superimposed and a synchronization portion, an edge in the tangential direction of a recording mark is not changed in phase, while with respect to a data portion on which sub-information is superimposed, the phase is advanced by the above-mentioned slight amount of time Δt when the PE modulation random number sequence is at the logic "H" level and delayed by the above-mentioned slight amount of time Δt when the PE modulation random number sequence is at the logic "L" level.

Referring again back to FIG. 3, in synchronization with logic "H/L" of a modulated channel signal MCH from the phase modulator 307, the recording channel 308 generates a control signal that changes the recording power of a laser beam to be outputted to the optical disk 310, and supplies it to the recording head 309.

Based on the control signal from the recording channel 308, the recording head 309, while adjusting the power of a laser beam, forms an optically readable modulated recording mark on the optical disk 310.

Figure 6:
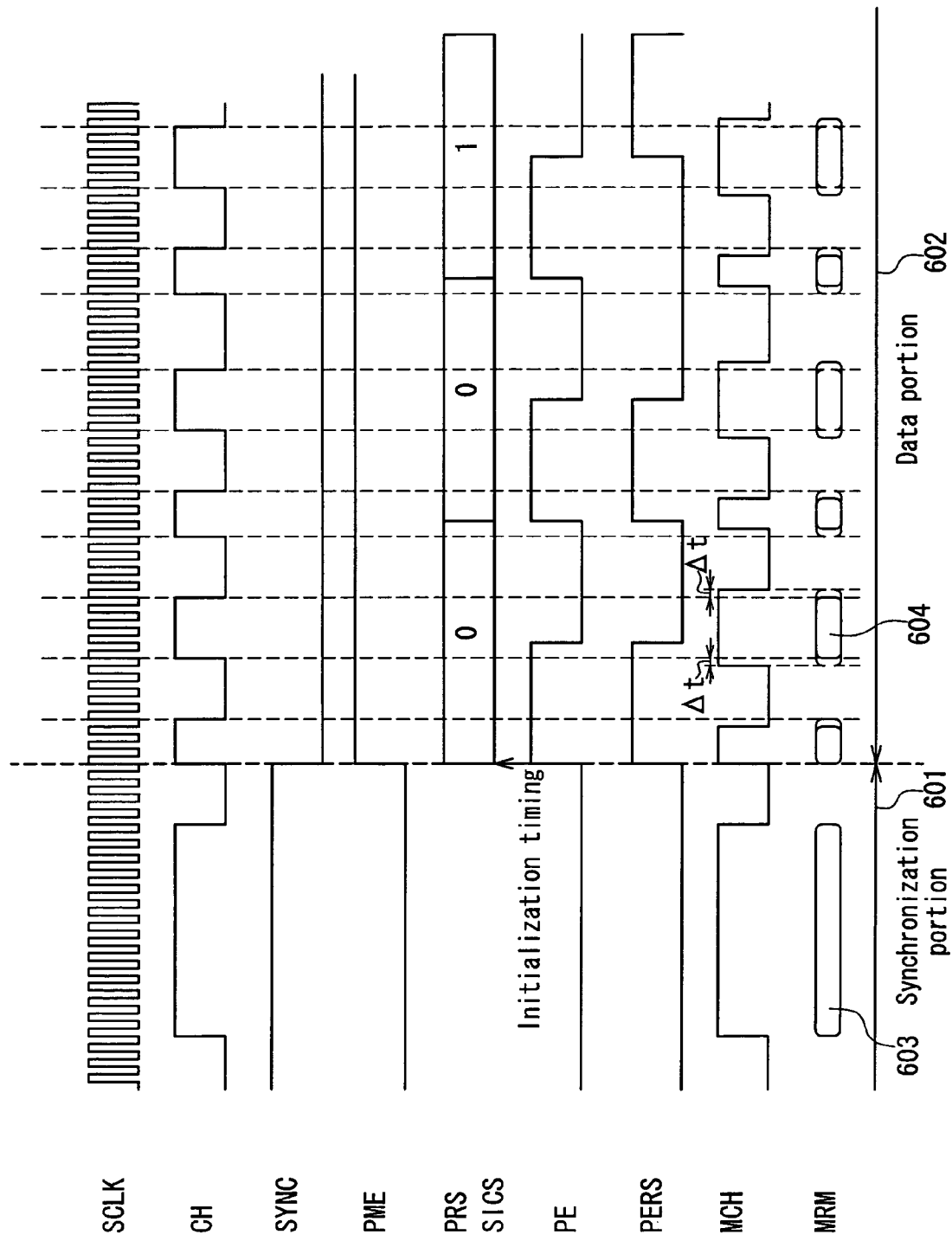
FIG. 6 is a detailed timing chart for signals in respective portions when a recording mark containing sub-information is formed on the optical disk by the information recording part 202 that is configured as in FIG. 3.

The description is directed next to a recording action of the optical disk recording apparatus according to this embodiment by referring to FIG. 6. FIG. 6 is a detailed timing chart for signals in respective portions when a modulated recording mark MRM containing sub-information is formed on the optical disk 310.

The timing generator 301 supplies the modulator 302 and the random number generator 304 with the synchronization signal SYNC synchronized with the inputted clock signal SCLK. When the synchronization signal SYNC outputted from the timing generator 301 is at the logic "H" level, the modulator 302 outputs the recording channel signal CH constituting a synchronization portion 601 to the phase modulator 307. Further, when the synchronization signal SYNC is at the logic "L" level, the modulator 302 performs modulation of main information to be recorded (for example, 8–16 modulation in the case of a DVD-RAM) and outputs the recording channel signal CH constituting a data portion 602 to the phase modulator 307. Further, the timing generator 301 outputs to the phase modulator 307 the phase modulation enabling signal PME that allows the logic "H" level to be attained in a time period of the data portion 602 in which sub-information is superimposed and recorded.

The random number initial value generator 303 outputs disk inherent identification information (of 64 bits, for example) in an as-is state, which has been read out in advance from the optical disk 310 and stored in the information storing part 201 (FIG. 2) prior to data recording, to the random number generator 304 as the initial value INITV During the time when the synchronization signal SYNC outputted from the timing generator 301 is at the logic "H" level, the random number generator 304 presets the disk inherent identification information from the random number initial value generator 303 so as to perform initialization. When the synchronization signal SYNC is at the logic "L" level, in synchronization with the byte clock BCLK from the timing generator 301, the random number generator 304 generates the pseudo random number sequence PRS 1 bit at a time and outputs it to the random number sequence converter 305.

The random number sequence converter 305 performs a bit operation (exclusive OR in this embodiment) with respect to sub-information to be recorded and the pseudo random number sequence PRS from the random number generator 304, generates the sub-information correlation sequence SICS (in the case where sub-information to be recorded is at the logic "L" level, a sequence equivalent to the pseudo random number sequence PRS; and in the case where sub-information to be recorded is at the logic "H" level, a sequence obtained by inverting the pseudo random number sequence PRS), and outputs it to the PE modulator 306. FIG. 6 shows the case where each bit of sub-information to be recorded is at the logic "L" level. Therefore, in this case, the sub-information correlation sequence SICS is a sequence equivalent to the pseudo random number sequence PRS. Moreover, based on the PE signal from the timing generator 301, the PE modulator 306 generates the PE modulation random number sequence PERS obtained by performing PE modulation with respect to the sub-information correlation sequence SICS from the random number sequence converter 305 and outputs it to the phase modulator 307.

When the phase modulation enabling signal PME from the timing generator 301 is at the logic "L" level, the phase modulator 307 outputs to the recording channel 308 the channel signal CH from the modulator 302 in an as-is state as the modulated channel signal MCH. Further, when the phase modulation enabling signal PME is at the logic "H" level, the phase modulator 307 advances or delays an edge of the channel signal CH according to a value of the PE modulation random number sequence PERS from the PE modulator 306. In this embodiment, in a time period in which the phase modulation enabling signal PME is at the logic "H" level, in the case where the PE modulation random number sequence PERS is at the logic "H" level, an edge in the tangential direction of the channel signal CH is advanced by Δt, and conversely, in the case where the PE modulation random number sequence PERS is at the logic "L" level, an edge of the channel signal CH is delayed by Δt. Thus, the modulated channel signal MCH is generated and outputted to the recording channel 308. Using the modulated channel signal MCH thus generated, a recording laser is controlled so as to form modulated recording marks MRM (603 and 604) on the optical disk 310.

The description is directed next to an optical disk reproducing apparatus that reproduces main information and sub-information from an optical disk in accordance with a pseudo random number sequence PRS generated by initialization using medium inherent information.

Figure 7:
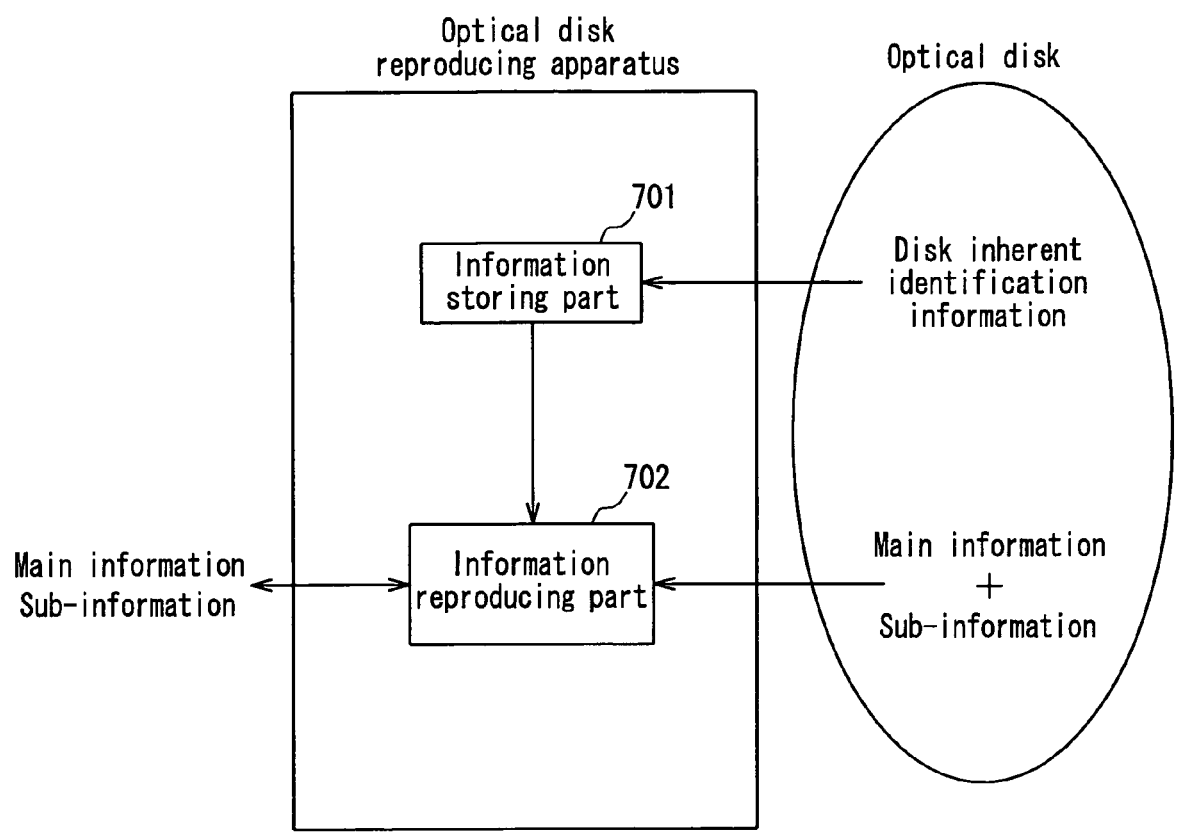
FIG. 7 is conceptual diagram showing a signal connection relationship between the optical disk and an optical disk reproducing apparatus as an information reproducing apparatus according to Embodiment 1 of the present invention.

FIG. 7 is conceptual diagram showing a signal connection relationship between the optical disk and an optical disk reproducing apparatus according to this embodiment. In FIG. 7, the optical disk reproducing apparatus is composed of an information storing part 701 that temporarily stores disk inherent identification information that has been read out in advance from the BCA (FIG. 22) and an information reproducing part 702 that reproduces main information and sub-information using the disk inherent identification information that has been stored in advance in the information storing part 701.

Figure 8:
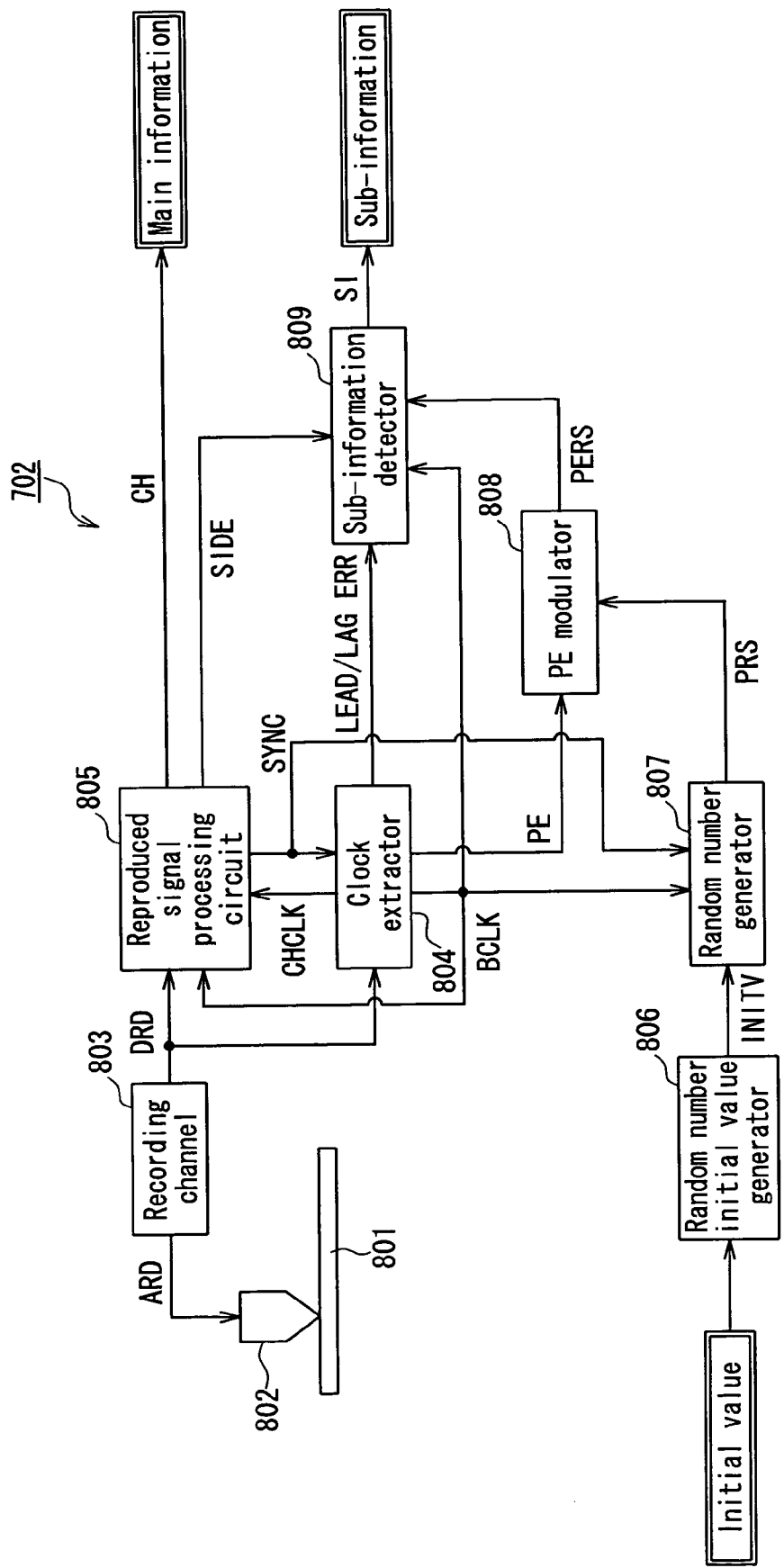
FIG. 8 is a block diagram mainly showing an example of a configuration of an information reproducing part 702 shown in FIG. 7.

FIG. 8 is a block diagram mainly showing an example of a configuration of the information reproducing part 702 shown in FIG. 7. In FIG. 8, the information reproducing part 702 is composed of a reproducing head 802, a reproducing channel 803, a clock extractor 804, a reproduced signal processing circuit 805, a random number initial value generating part 806, a random number generator 807, a PE modulator 808, and a sub-information detector 809.

The reproducing head 802 focuses and irradiates a light beam on a recorded mark on an optical disk 801 being rotated, receives reflected light thereof with a photodiode, and then amplifies the reflected light so as to generate an analog read-out signal (ARD) and supply it to the reproducing channel 803.

The reproducing channel 803 converts the analog read-out signal ARD from the reproducing head 802 into a digital read-out signal (DRD) by equalizing or shaping the waveform of the signal and supplies the digital read-out signal DRD to each of the clock extractor 804 and the reproduced signal processing circuit 805.

Based on the digital read-out signal DRD from the reproducing channel 303, the clock extractor 804 generates a channel clock (CHCLK) synchronized with a channel bit and supplies it to the reproduced signal processing circuit 805. Further, the clock extractor 804 generates a byte clock (BCLK) synchronized with each piece of recording data (byte unit) in the digital read-out signal DRD and supplies it to each of the reproduced signal processing circuit 805, the random number generator 807, and the sub-information detector 809. Further, at the same time, with reference to the channel clock CHCLK, the clock extractor 804 detects a phase error of the digital read-out signal DRD. In the case where phase advance is detected, the clock extractor 804 generates a leading phase error signal (LEAD ERR) and supplies it to the sub-information detector 809, and in the case where phase delay is detected, the clock extractor 804 generates a lagging phase error signal (LAG ERR) and supplies it to the sub-information detector 809.

The reproduced signal processing circuit 805 detects a synchronization portion from the digital read-out signal DRD from the reproducing channel 303 and demodulates a channel signal CH (main information) from the digital read-out signal DRD with reference to the synchronization portion.

Figure 9:
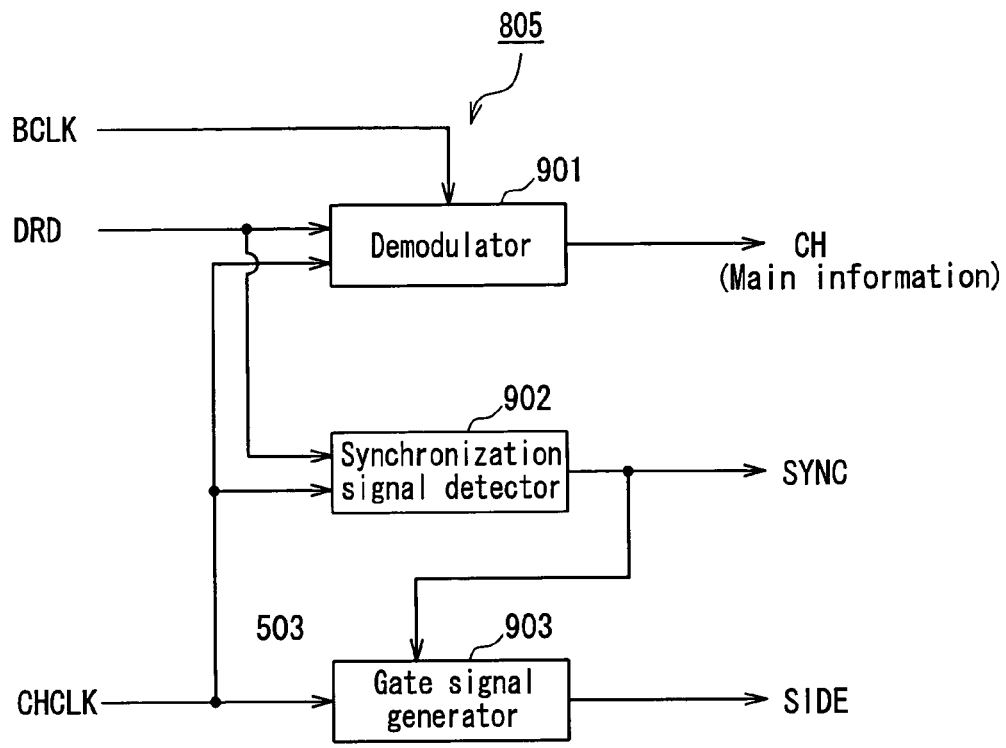
FIG. 9 is a circuit block diagram showing an example of an internal configuration of a reproduced signal processing circuit 805 shown in FIG. 8.

FIG. 9 is a circuit block diagram showing an example of an internal configuration of the reproduced signal processing circuit 805. In FIG. 9, the reproduced signal processing circuit 805 is composed of a demodulator 901, a synchronization signal detector 902, and a gate signal generator 903.

The synchronization signal detector 902 detects a synchronization portion (synchronization pattern) contained in the digital read-out signal DRD, generates a synchronization signal (SYNC), and outputs it to each of the clock extractor 804 and the random number generator 807.

The demodulator 901 is a demodulator with respect to the modulator of the optical disk recording apparatus. By the demodulator 901, the digital read-out signal DRD from the reproducing channel 803 is sampled in synchronization with the channel clock CHCLK from the clock extractor 804 and is converted into an 8-bit channel signal CH corresponding to a 16-bit channel code in synchronization with the byte clock BCLK from the clock extractor 804 to be outputted as main information.

Furthermore, with reference to the synchronization signal SYNC, the gate signal generator 903 outputs to the sub-information detector 809 a sub-information detection enabling signal (SIDE) that is a signal indicating a data portion of each frame in which sub-information is recorded frame other than leading and final frames of each sector).

Referring back to FIG. 8, the random number initial value generator 806 calculates an initial value (INITV) of a random number from disk inherent identification information (of 64 bits, for example) that has been read out in advance from the BCA (FIG. 22) on the optical disk 801 and stored primarily in the information storing part 701 (FIG. 7) and supplies it to the random number generator 807. In this embodiment, similarly to the above-described disk recording apparatus, the random number initial value generator 806 supplies to the random number generator 807 the disk inherent identification information in an as-is state as the initial value INITV of the random number.

The random number generator 807 has the same function as that of the random number generator 304 (FIG. 3) of the optical disk recording apparatus. That is, the random number generator 807 presets the initial value INITV from the random number initial value generator 806 at a timing of the synchronization signal SYNC from the reproduced signal processing circuit 805 and generates a pseudo random number sequence PRS (M sequence) at a timing of the byte clock BCLK from the clock extractor 804.

The PE modulator 808 has the same function as that of the PE modulator 306 (FIG. 3) of the optical disk recording apparatus. That is, based on a PE signal from the clock extractor 804, the PE modulator 808 performs PE modulation with respect to the pseudo random number sequence PRS outputted from the random number generator 807 and supplies to the sub-information detector 809 a resultant sequence as a PE modulation random number sequence PERS.

The sub-information detector 809 detects a correlation between the PE modulation random number sequence PERS from the PE modulator and each of the leading phase error signal LEAD ERR and the lagging phase error signal LAG ERR that are outputted from the clock extractor 804.

Figure 10:
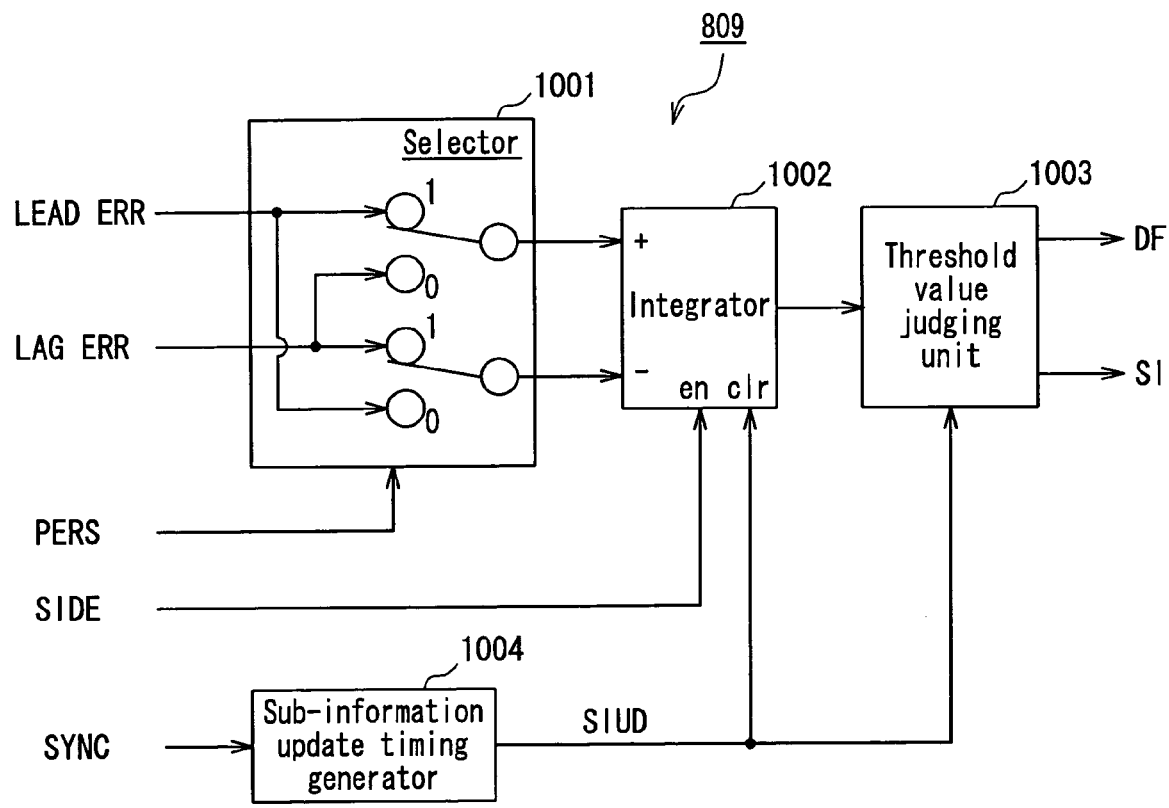
FIG. 10 is a circuit block diagram showing an example of an internal configuration of a sub-information detector 809 shown in FIG. 8.

FIG. 10 is a circuit block diagram showing an example of an internal configuration of the sub-information detector 809. In FIG. 10, the sub-information detector is composed of a selector 1001, an integrator 1002, a threshold value judging unit 1003, and a sub-information update timing generator 1004.

The selector 1001 is formed of two switching circuits each having two inputs and one output. When the PE modulation random number sequence PERS from the PE modulator 808 is at the logic "H" level, the selector 1001 allows the leading phase error signal LEAD ERR and the lagging phase error signal LAG ERR to pass through a positive input terminal (+) and a negative input terminal (−) of the integrator 1002, respectively. Further, when the PE modulation random number sequence PERS is at the logic "L" level, the selector 1001 allows them to be crossed and pass through the negative input terminal (−) and the positive input terminal (+) of the integrator 1002, respectively.

The integrator 1002 is a differential input/bipolar output analog integrator. When the sub-information detection enabling signal SIDE from the reproduced signal processing circuit 805 is at the logic "H" level, the integrator 1002 adds areas of pulses inputted to the positive input terminal to accumulate a resultant value, concurrently therewith subtracts areas of pulses inputted to the negative input terminal to accumulate a resultant value, and outputs to the threshold value judging unit 1003 an analog signal corresponding to the accumulated areas. Further, when the sub-information detection enabling signal SIDE is at the logic "L" level, the integrator 1002 retains a value resulting from the most recent accumulation. When a sub-information update signal (SIUD) is outputted from the sub-information update timing generator 1004, the integrator 1002 clears the retained value resets the value to zero).

As a result, during a period of time when the PE modulation random number sequence PERS outputted from the PE modulator 808 is at the logic "H" level, the integrator 1002 adds areas of pulses that occur in the leading phase error signal LEAD ERR to accumulate a resultant value and subtracts areas of pulses that occur in the lagging phase error signal LAG ERR to accumulate a resultant value. Further, during a period of time when the PE modulation random number sequence PERS is at logic "L", the integrator 1002 subtracts areas of pulses that occur in the leading phase error signal LEAD ERR to accumulate a resultant value and adds areas of pulses that occur in the lagging phase error signal LAG ERR to accumulate a resultant value. Then, the integrator 1002 outputs an analog voltage corresponding to the accumulated value.

Therefore, in the case where a positive correlation continues in which pulses occur only in the leading phase error signal LEAD ERR during a period of time when the PE modulation random number sequence PERS is at the logic "H" level and pulses occur only in the lagging phase error signal LAG ERR during a period of time when the PE modulation random number sequence PERS is at the logic "L", the output voltage of the integrator 1002 increases in a positive direction. Conversely, in the case where a negative correlation continues in which pulses occur only in the lagging phase error signal LAG ERR during a period of time when the PE modulation random number sequence PERS is at the logic "H" level and pulses occur only in the leading phase error signal LEAD ERR during a period of time when the PE modulation random number sequence PERS is at the logic "L" level, the output voltage of the integrator 1002 decreases in a negative direction. Further, in the case where none of these correlations exists due to a difference in, for example, initial value from the random number initial value generator 806, that is, in the case where pulses occur randomly in the leading phase error signal LEAD ERR and the lagging phase error signal LAG ERR irrespective of the PE modulation random number sequence PERS, the frequencies of the occurrence of pulses that occur respectively in those error signals are substantially the same, so that the output voltage of the integrator 1002 approximates to a zero level.

The threshold value judging unit 1003 is formed of, for example, a comparator that judges to which section the output voltage of the integrator 1002 belongs, among three voltage sections separated based on a positive threshold voltage and a negative threshold voltage that have been set in advance. At a point in time when the sub-information update signal SIUD from the sub-information update timing generator 1004 is inputted, the threshold value judging unit 1003 produces an output as sub-information 1 bit at a time in the form of a code string and sets a detection flag (DF) to the logic "H" level. In this case, when the output voltage of the integrator 1002 is larger than a positive threshold value, the code string is at the logic "L" level, and when the output voltage is smaller than a negative threshold value, the code string is at the logic "H" level. Further, in the case where the output voltage of the integrator 1002 belongs to a section between both the threshold values, the threshold value judging unit 1003 outputs the logic "L" level as the detection flag DF.

The sub-information update timing generator 1004 generates a timing for updating sub-information based on the inputted synchronization signal SYNC. The sub-information update signal SIUD is a pulse signal that is outputted for every 3 frames with respect to frames other than leading and final frames of each sector. The sub-information update signal SIUD dears the value of the integrator 1002 and updates a result of judgment by the threshold value judging unit 1003.

Figure 11:
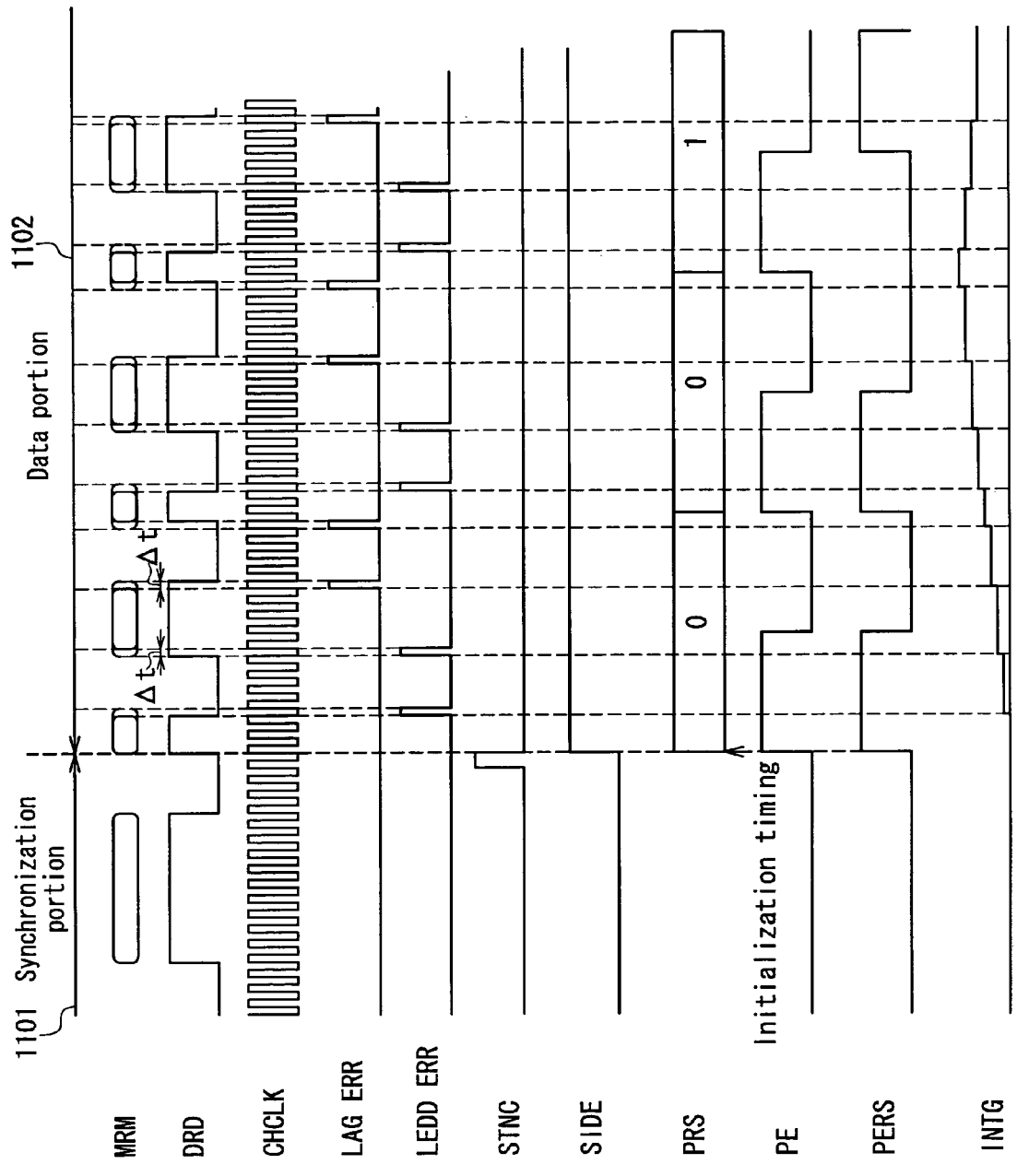
FIG. 11 is a detailed timing chart for signals in respective portions when sub-information is reproduced from a recorded mark on the optical disk by the information reproducing part 702.

The description is directed next to a reproducing action of the optical disk reproducing apparatus according to this embodiment by referring to FIG. 11. FIG. 11 is a detailed timing chart for signals in respective portions when sub-information is reproduced from a recorded mark on the optical disk 801.

When the digital read-out signal DRD, which is generated using reflected light resulting from laser irradiation onto the modulated recorded mark MRM on the optical disk 801, is inputted to the clock extractor 804, the channel clock CHCLK is generated that is obtained by synchronizing both edges of the digital read-out signal DRD with a phase of a rising edge. By the reproduced signal processing circuit 805, the digital read-out signal DRD is sampled using the channel clock CHCLK, and it is checked by comparison if it agrees with a specific synchronization pattern so as to seek a synchronization portion 1101 in data. When a pattern agreeing with the synchronization pattern is detected, the synchronization signal SYNC is outputted, and the sub-information detection enabling signal SIDE of the logic "H" level is outputted with respect to a data portion 1102 of each frame in which sub-information is superimposed (frame other than leading and final frames of each sector).

When the synchronization signal SYNC is outputted, the clock extractor 804 dears an internal four-frequency divider and outputs the PE signal and the byte clock BCLK obtained by 16-frequency-division of the channel clock CHCLK. Further, the clock extractor 804 presets the disk inherent identification information (of 64 bits, for example), which has been stored in advance in the read-out information storing part 701 (FIG. 7), so as to initialize the random number generator 807, and the random number generator 807 outputs the pseudo random number sequence PRS 1 bit at a time at a timing of the byte clock BCLK (for every 16 channel clocks). Using the pseudo random number sequence PRS and the PE signal, the PE modulator 808 generates the PE modulation random number sequence PERS such that a 8-channel clock section of the logic "H" level and a 8-channel clock section of the logic "L" level are provided within every 16 channel clocks.

The clock extractor 804 detects a phase error between a rising edge of the channel clock CHCLK and each edge of the digital read-out signal DRD. In the case where the edge of the digital read-out signal DRD is advanced with respect to the rising edge of the channel clock CHCLK, the clock extractor 804 outputs the leading phase error signal LEAD ERR. Further, in the case where the edge of the digital read-out signal DRD is delayed with respect to the rising edge of the channel clock CHCLK, the clock extractor 804 outputs the lagging phase error signal LAG ERR.

In a period of time when the sub-information detection enabling signal SIDE is at the logic "H" level, during a period of time when the PE modulation random number sequence PERS is at the logic "H" level, the sub-information detector 809 adds the leading phase error signal LEAD ERR and subtracts the lagging phase error signal LAG ERR. Further, during a period of time the PE modulation random number sequence PERS is at the logic "L" level, the sub-information detector 809 adds the lagging phase error signal LAG ERR and subtracts the leading phase error signal LEAD ERR. In FIG. 11, in a period of time starting from the beginning of the data portion 1102, in which the pseudo random number sequence PRS is at the logic "L" level, during a period of time when the PE modulation random number sequence PERS is at the "H" level, the leading phase error signal LEAD ERR is outputted, and during a period of time when the PE modulation random number sequence PERS is at the logic "L" level, the lagging phase error signal LAG ERR is outputted, so that the output voltage (INTG) of the integrator 1002 (FIG. 10) included in the sub-information detector 809 increases.

Thus, at a point in time when integration with respect to a section in which 1 bit of sub-information is recorded is completed (at a point in time when the sub-information update signal SIUD is outputted): in the case where the output voltage of the integrator 1002 is higher than a positive threshold voltage, the logic "L" level is detected as sub-information (at the same time, the logic "H" level is outputted as the detection flag DF); in the case where the output voltage is lower than a negative threshold voltage, the logic "H" level is detected as sub-information (at the same time, the logic "H" is outputted as a detection flag); and in the case where the output voltage lies between the negative threshold voltage and the positive threshold voltage, the logic "L" level is outputted as a detection flag.

Figure 12:
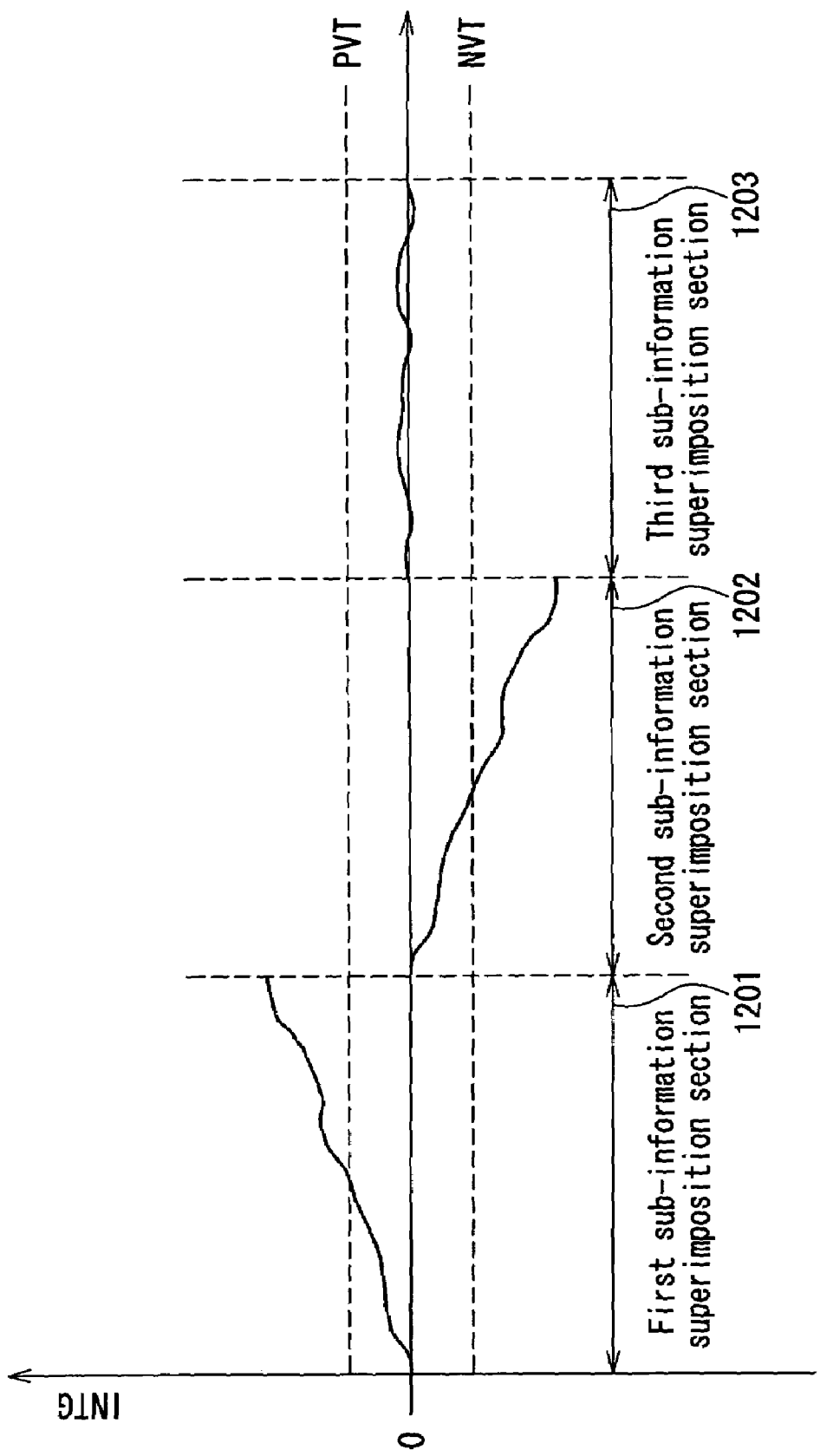
FIG. 12 is a waveform chart showing a relationship between a sub-information bit and an output voltage of an integrator 1002 included in the sub-information detector 809 shown in FIG. 8.

FIG. 12 is a waveform chart showing a relationship between a sub-information bit and the integral value INTG obtained by the integrator 1002 included in the sub-information detector 809. In FIG. 12, in a first sub-information superimposition section 1201, there is a correlation with the pseudo random number sequence PRS initialized using the disk inherent identification information and the integral value INTG keeps increasing to exceed a positive threshold value (PVT), so that the logic "L" level is extracted as sub-information. Conversely, in a second sub-information superimposition section 1202, there is an inverse correlation with the pseudo random number sequence PRS initialized using the disk inherent identification information and the integral value INTG keeps decreasing to exceed a negative threshold value (NVT), so that the logic "H" level is extracted as sub-information.

Meanwhile, a third sub-information superimposition section shows a value as the integral value INTG that is obtained in the case where sub-information is duplicated from one optical disk A to another optical disk B. The sub-information recorded on the optical disk A is recorded in accordance with the pseudo random number sequence PRS initialized using disk inherent identification information of the optical disk A, and thus the sub-information duplicated illegally to the another optical disk B also is correlated with the pseudo random number sequence PRS initialized using the disk inherent identification information of the optical disk A. Therefore, in the case of reproducing the optical disk B, since there is no correlation between a pseudo random number sequence initialized using disk inherent identification information of the optical disk B and the duplicated sub-information, the integral value INTG does not increase nor decrease and thus does not exceed the positive threshold value PVT and the negative threshold value NVT, sub-information cannot be reproduced appropriately.

As described above, in this embodiment, in accordance with a pseudo random number sequence that is initialized using an initial value calculated from medium inherent information recorded on an optical disk, an edge in the tangential direction of a recording mark is displaced to a position advanced or delayed by a slight amount, and thus sub-information is recorded.

Thus, in the optical disk recording apparatus and the optical disk reproducing apparatus according to this embodiment, since when performing recording or reproduction of sub-information with respect to the same optical disk, medium inherent information recorded on the optical disk also is the same, it is possible to obtain a pseudo random number sequence for recording or reproducing the sub-information that is inherent in the medium. Conversely, in the case where main information and sub-information of an optical disk A are duplicated entirely to another optical disk B, since the sub-information that has been recorded using a pseudo random number sequence generated using medium inherent information of the optical disk A as an initial value is incompatible with a pseudo random number sequence generated using medium inherent information of the optical disk B as an initial value, the sub-information duplicated illegally to the optical disk B cannot be reproduced.

Conventionally, in the case of recording as sub-information copyright management information that requires secure information rewriting between media such as, for example, the possible number of times of duplication and the number of times of transfer between media of chargeable digital works recorded on an optical disk, if sub-information is duplicated entirely to another medium, there has been a risk of allowing the infinite number of times of duplication even with a restriction set on the possible number of times of copying. However, when the sub-information in this embodiment is used in recording copyright management information, even if the sub-information is duplicated entirely to another medium, because of a difference in disk inherent identification information that is a medium identifier, it is possible to prevent reproduction of the illegally duplicated sub-information, thereby allowing copyright management information of digital works and the like to be recorded securely.

(Embodiment 2)

An optical disk according to Embodiment 2 of the present invention has inside itself apparatus nullification information for nullifying recording and reproduction by an apparatus. For example, in a DVD-RAM, as shown in FIG. 22, an encryption medium key bundle has been recorded in advance as apparatus nullification information in an inner rim control area 2202. The encryption medium key bundle is generated by encrypting a medium key using a device key contained individually in each proper apparatus. Such a case requires large capacity for recording an encryption medium key bundle according to the number of apparatuses, and thus in order to reduce the capacity of the corresponding encryption medium key bundle, matrix type and tree type data structures have been proposed. In an apparatus without a proper device key, it is impossible to generate an appropriate medium key from an encryption medium key bundle recorded on an optical disk, so that encrypted digital works recorded on the optical disk cannot be decoded reproduced). Further, if, for example, an apparatus exists that has performed illegal duplication of digital works by tampering with the apparatus, an encryption medium key that can be decoded using a device key of the apparatus tampered with is eliminated from the encryption medium key bundle on the optical disk. Thus, it is possible to nullify recording and reproduction of digital works with respect to an optical disk on which an updated encryption medium key bundle is recorded Meanwhile, a proper licensed apparatus has a proper device key inside the apparatus and uses this device key to decode an encryption medium key bundle so that a proper medium key can be generated. Therefore, proper apparatuses can generate a proper medium key, thereby allowing compatibility to be imparted among the apparatuses in terms of recording or reproduction of digital works.

In an optical disk recording apparatus according to this embodiment, a pseudo random number sequence is generated using an initial value that is calculated from information (medium key) outputted as a result of an apparatus nullification process in which a proper medium key is generated from an encryption medium key bundle using a device key. Using a value of the pseudo random number sequence, the optical disk recording apparatus records sub-information, thereby allowing nullification of an apparatus to be achieved even in terms of recording of sub-information.

Figure 13:
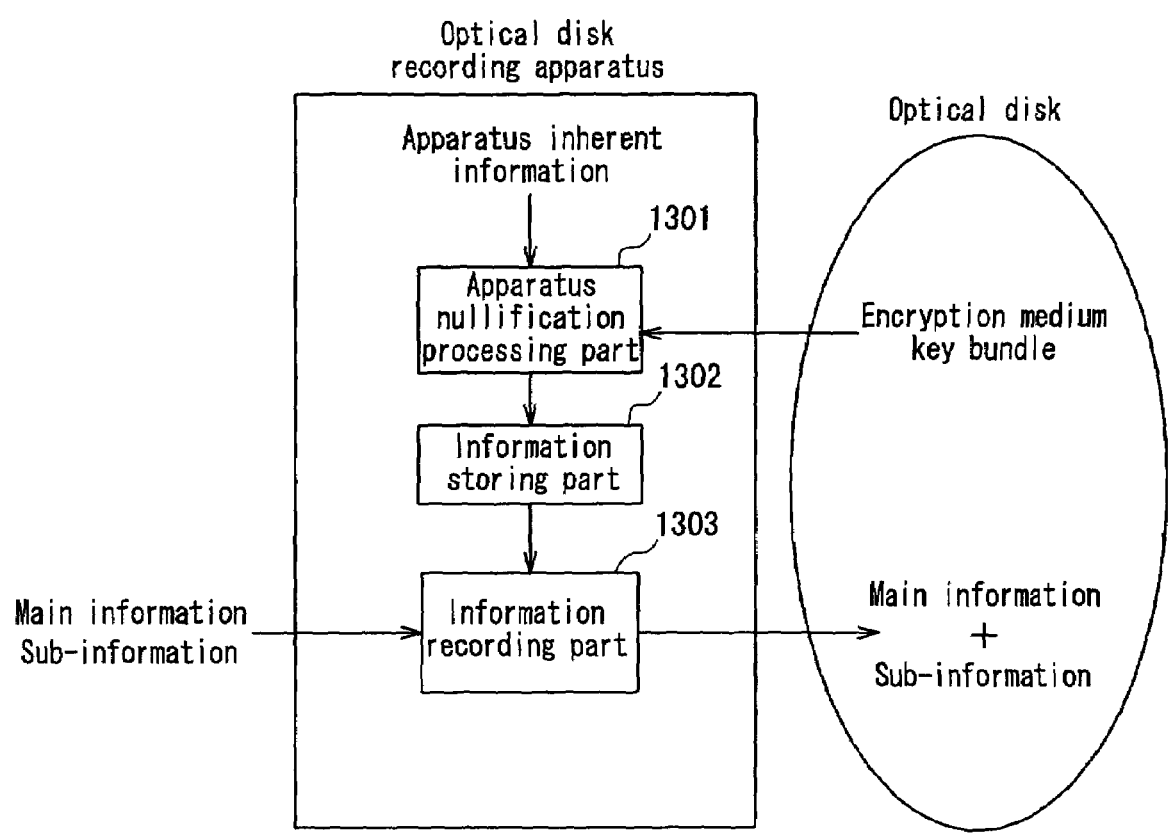
FIG. 13 is a conceptual diagram showing a signal connection relationship between an optical disk as an information recording medium and an optical disk recording apparatus as an information recording apparatus according to Embodiment 2 of the present invention.

FIG. 13 is a conceptual diagram showing a signal connection relationship between the optical disk and the optical disk recording apparatus according to Embodiment 2 of the present invention. In FIG. 13, the optical disk recording apparatus according to this embodiment is composed of an apparatus nullification processing part 1301 in which a medium key for encrypting digital works to be recorded is decoded from apparatus inherent information (device key) that is contained secretly inside the apparatus and an encryption medium key bundle that can exist and is obtained by encrypting the medium key using the apparatus inherent information; an information storing part 1302 that temporarily stores the medium key (of 64 bits, for example) outputted from the apparatus nullification processing part 1301; and an information recording part 1303 that simultaneously records main information and sub-information on an optical disk in accordance with a pseudo random number sequence that is generated using an initial value calculated from the medium key stored temporarily in the information storing part 1302.

The information recording part 1303 has the same block configuration as that of the information recording part 202 in the optical disk recording apparatus according to Embodiment 1, which is shown in FIG. 3. By the information recording part 1303, in accordance with a pseudo random number sequence that is generated using a medium key stored temporarily in the information storing part 1302 as an initial value for a random number generator, an edge in a tangential direction of a recording mark is displaced to a position advanced or delayed by a slight amount, and thus sub-information is recorded.

Figure 14:
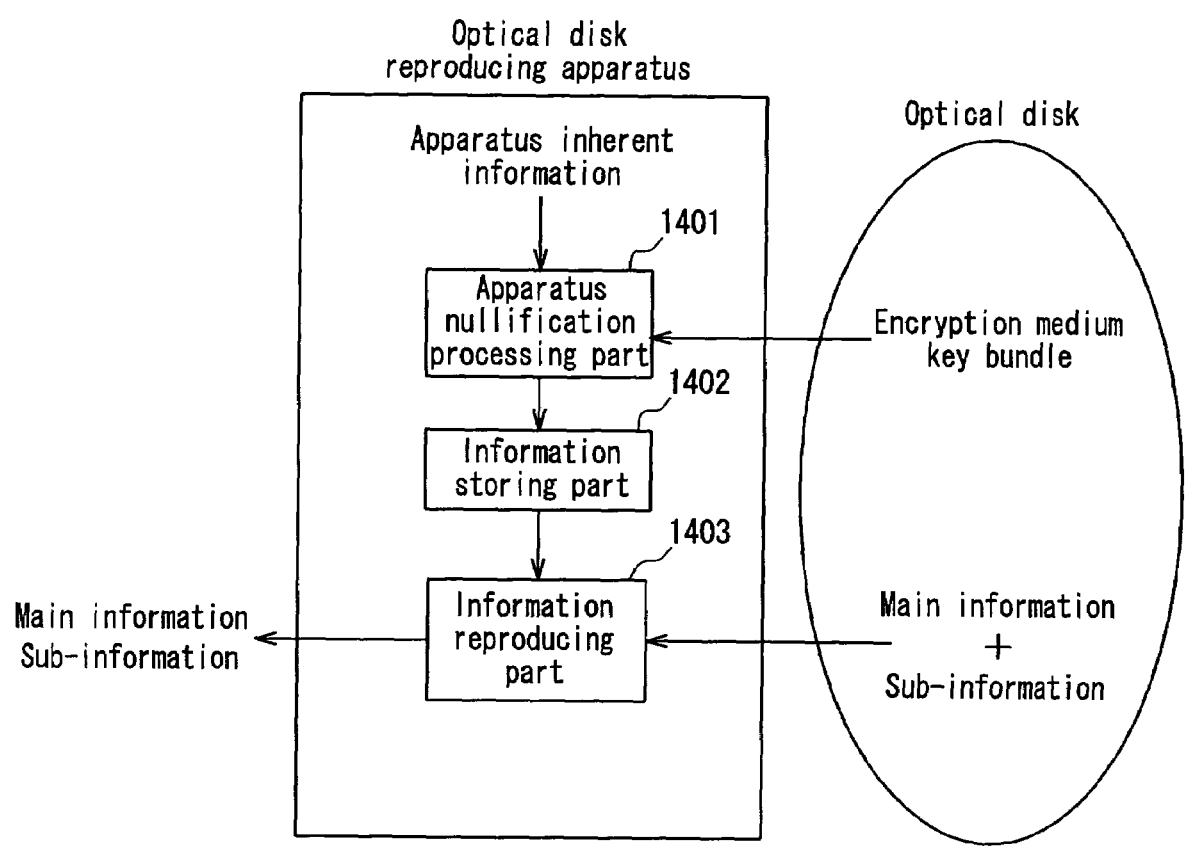
FIG. 14 is a conceptual diagram showing a signal connection relationship between the optical disk as the information recording medium and an optical disk reproducing apparatus as an information reproducing apparatus according to Embodiment 2 of the present invention.

FIG. 14 is a conceptual diagram showing a signal connection relationship between the optical disk and an optical disk reproducing apparatus according to Embodiment 2 of the present invention. In FIG. 14, the optical disk reproducing apparatus is an apparatus that reproduces main information and sub-information from an optical disk on which the above-described encryption medium key bundle for nullifying an apparatus is recorded. The optical disk reproducing apparatus is composed of an apparatus nullification processing part 1401 that decodes a medium key from an encryption medium key bundle that has been read out in advance from the optical disk and apparatus inherent information (device key) that is contained secretly inside the apparatus; an information storing part 1402 that temporarily stores the medium key outputted from the apparatus nullification processing part 1401; and an information reproducing part 1403 that simultaneously reproduces main information and sub-information in accordance with a pseudo random number sequence that is generated using an initial value calculated from the medium key stored temporarily in the information storing part 1402.

The apparatus nullification processing part 1401 has the same function as that of the apparatus nullification processing part 1301 in the optical disk recording apparatus, which is shown in FIG. 13. That is, the apparatus nullification processing part 1401 decodes a medium key from an encryption medium key bundle that has been recorded in advance in an optical disk and the device key that is contained secretly inside the reproducing apparatus. Thus, it is impossible to decode an appropriate medium key using an illegal device key, a nullified device key, or an adulterated encryption medium key bundle.

The information reproducing part 1403 generates a pseudo random number sequence using as an initial value a medium key that has been decoded in advance by the apparatus nullification processing part 1401 and reproduces sub-information based on a correlation of the generated pseudo random number sequence with a phase error signal of an edge in the tangential direction of a recorded mark to be reproduced, having the same configuration as that of the information reproducing part 702 in the optical disk reproducing apparatus.

Also in this embodiment, as described in Embodiment 1 by referring to FIG. 12, in the first sub-information superimposition section 1201, the logic "L" level is extracted as a sub-information bit, and in the second sub-information superimposition section 1202, the logic "H" level is extracted as a sub-information bit.

The third sub-information superimposition section 1203 shows an integral value of an optical disk on which sub-information is recorded by a nullified apparatus as described in this embodiment or an integral value resulting from reproducing the sub-information by the nullified apparatus. In a nullified apparatus, it is impossible to generate an accurate medium key from apparatus nullification information (encryption medium key bundle) that is recorded on an optical disk and apparatus inherent information (device key) that is contained secretly inside the apparatus. Therefore, in the case of reproducing, using an accurate medium key, sub-information recorded in accordance with a pseudo random number sequence initialized using such an illegal medium key, or in the case of reproducing sub-information, which is recorded in accordance with a pseudo random number sequence initialized using an accurate medium key, in accordance with a pseudo random number sequence initialized using an illegal medium key of a nullified apparatus, there is no correlation between the pseudo random number sequence on a recording side and the pseudo random number sequence on a reproduction side. Therefore, the integral value INTG does not increase nor decrease, and thus the sub-information is not extracted appropriately.

As described above, in this embodiment, the apparatus nullification processing parts 1301 and 1401 are provided that can perform nullification of an apparatus using apparatus inherent information that is contained secretly inside an apparatus and an encryption medium key bundle that has been recorded in advance on an optical disk. An initial value is calculated from information (medium key) outputted from the apparatus nullification processing parts 1301 and 1401, and in accordance with a pseudo random number sequence initialized using the calculated initial value, sub-information is recorded or reproduced.

As in a conventional technique, in a method of recording sub-information based on a correlation with a specific pseudo random number sequence, even an apparatus in which main information recording and reproduction are nullified can record sub-information appropriately. Further, in a method of reproducing sub-information based on a correlation with a specific pseudo random number sequence, even an apparatus in which main information recording and reproduction are nullified can reproduce sub-information appropriately. Therefore, in the case where copyright management information such as information for managing the number of times of duplication of digital works is recorded as sub-information, even with the advent of an apparatus, obtained by tamperings for example, that can perform an infinite number of duplications of digital works by illegally rewriting the information for managing the number of times of duplication recorded as the sub-information, there is no way of nullifying recording and reproduction of the sub-information by the apparatus.

However, this embodiment has a mechanism in which sub-information can be recorded or reproduced appropriately only by using a pseudo random number sequence that is initialized using information (medium key) obtained as a result of an apparatus nullification process. Therefore, even with the advent of an apparatus that illegally rewrites sub-information by tampering or the like, by updating from then on an encryption medium key bundle of each medium being distributed, it is possible to nullify recording and reproduction of sub-information with respect to a medium having the updated encryption medium key bundle.

As discussed in the foregoing description, according to this embodiment, in the case of recording copyright management information as sub-information, even in a situation where by, for example, tampering with an apparatus, digital works are duplicated illegally, by distributing optical disks having updated encryption medium key bundles, it is possible to suppress damage to a minimum degree.

(Embodiment 3)

An optical disk recording apparatus according to Embodiment 3 of the present invention has inherent information for identifying an apparatus. For example, apparatus inherent information in a DVD-RAM recording apparatus is referred to as a device key. By decoding an encryption medium key bundle that has been recorded in advance on an optical disk using this device key, a medium key for encrypting digital works is generated. As has already been described in Embodiment 2, by the apparatus inherent information and the encryption medium key bundle on the optical disk, recording and reproduction of main information are nullified.

In the optical recording apparatus according to this embodiment, sub-information is recorded based on apparatus inherent information so as to disable reproduction of the sub-information by apparatuses other than the apparatus that has performed recording of the sub-information.

Figure 15:
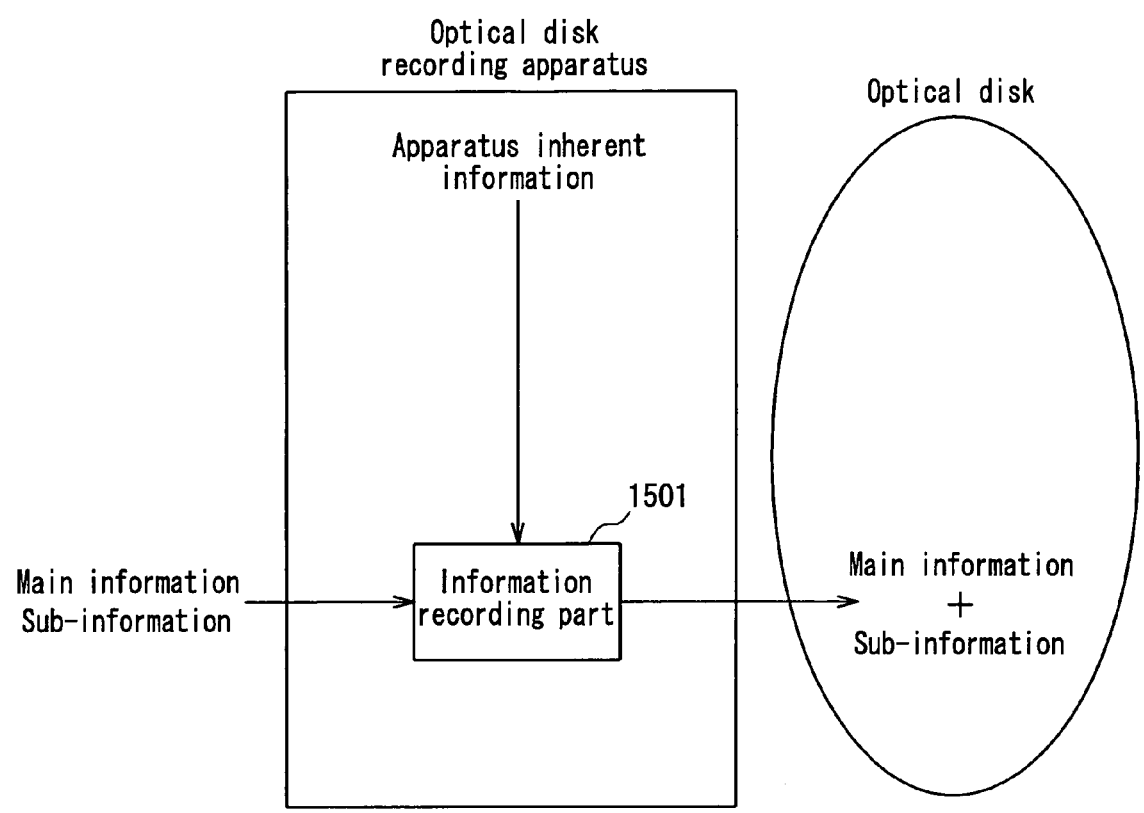
FIG. 15 is a conceptual diagram showing a signal connection relationship between an optical disk as an information recording medium and an optical disk recording apparatus as an information recording apparatus according to Embodiment 3 of the present invention.

FIG. 15 is a conceptual diagram showing a signal connection relationship between an optical disk and the optical disk recording apparatus according to Embodiment 3 of the present invention. In FIG. 15, the optical disk recording apparatus secretly contains apparatus inherent information inside the apparatus and includes an information recording part 1501 that simultaneously records main information and sub-information on an optical disk in accordance with a pseudo random number sequence that is obtained using the apparatus inherent information as an initial value.

The information recording part 1501 has the same block configuration as that (FIG. 3) of each of the information recording part 202 in Embodiment 1 shown in FIG. 2 and the information recording part 1303 in Embodiment 2 shown in FIG. 13. By the information recording part 1501, in accordance with a pseudo random number sequence that is generated using apparatus inherent information contained inside the apparatus as an initial value for a pseudo random number generator, an edge in a tangential direction of a recording mark is displaced to a position advanced or delayed by a slight amount, and thus sub-information is recorded. Also in this embodiment, similarly to Embodiments 1 and 2, an initial value generating part 303 of the optical disk recording apparatus has a configuration in which apparent inherent information contained inside the apparatus is outputted in an as-is state.

Figure 16:
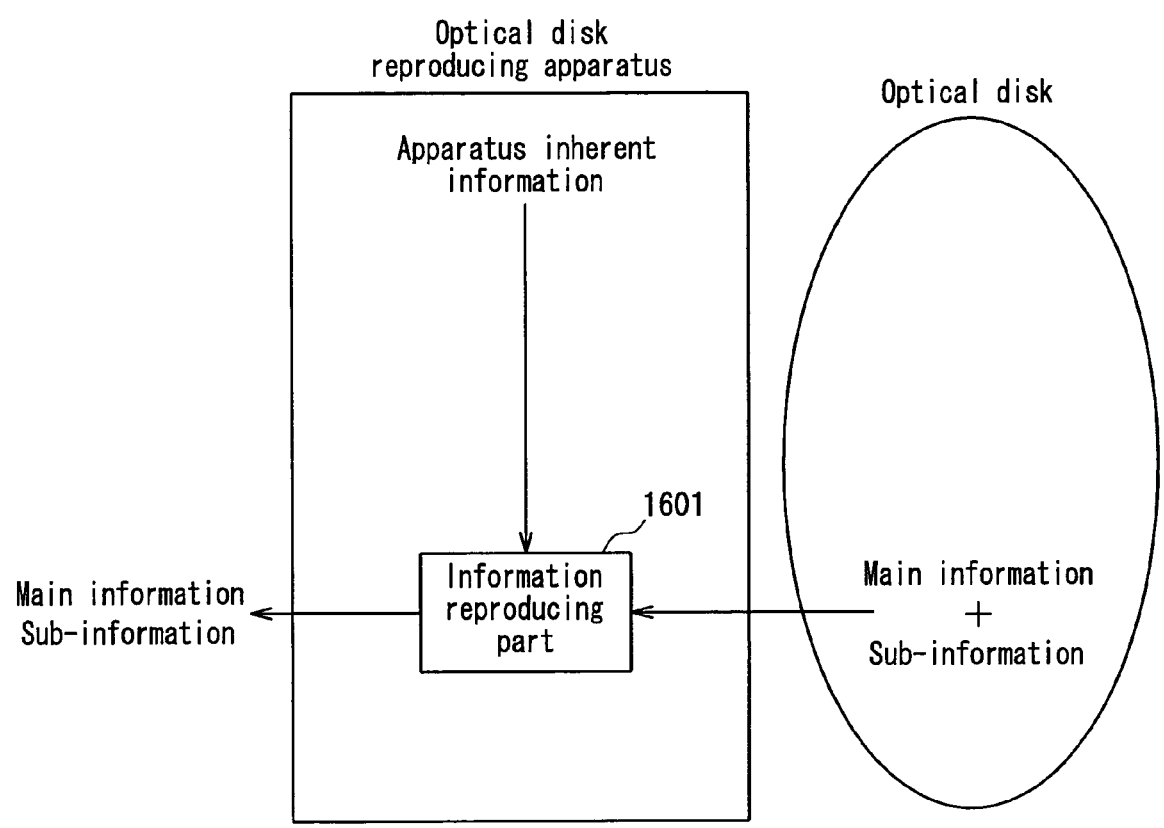
FIG. 16 is a conceptual diagram showing a signal connection relationship between the optical disk as the information recording medium and an optical disk reproducing apparatus as an information reproducing apparatus according to Embodiment 3 of the present invention.

FIG. 16 is a conceptual diagram showing a signal connection relationship between an optical disk and an optical disk reproducing apparatus according to Embodiment 3 of the present invention. In FIG. 16, similarly to the optical disk recording apparatus according to this embodiment, the optical disk reproducing apparatus according to this embodiment contains apparatus inherent information that is inherent in each apparatus and includes an information reproducing part 1601 that simultaneously reproduces main information and sub-information in accordance with a pseudo random number sequence that is generated using the apparatus inherent information as an initial value.

The information reproducing part 1601 generates a pseudo random number sequence by using as an initial value apparatus inherent information that is contained individually in each apparatus and reproduces sub-information based on a correlation between the generated pseudo random number sequence and a phase error signal of an edge in the tangential direction of a recorded mark to be reproduced, having the same configuration as that of the information reproducing part 702 in Embodiment 1 shown in FIG. 8.

Also in this embodiment, as described in Embodiment 1 by referring to FIG. 12, in the first sub-information superimposition section 1201, the logic "L" level is extracted as a sub-information bit, and in the second sub-information superimposition section 1202, the logic "H" level is extracted as a sub-information bit.

Meanwhile, the third sub-information superimposition section 1203 shows an integral value obtained in the case of performing reproduction with respect to an optical disk, on which main information and sub-information are recorded by the optical disk recording apparatus according to this embodiment, by an apparatus different from the apparatus that has performed recording with respect to the optical disk. In this case, since the sub-information is recorded in accordance with a pseudo random number sequence that is initialized using information inherent in the recording apparatus, there is no correlation between the sub-information and a pseudo random number sequence that is initialized using information inherent in a reproducing apparatus different from the recording apparatus. Therefore, the integral value does not increase nor decrease, and thus the sub-information is not extracted appropriately.

As described above, in this embodiment, a pseudo random number sequence is generated based on apparatus inherent information that is contained secretly inside an apparatus, and recording or reproduction of sub-information is performed in accordance with this pseudo random number sequence, thereby allowing sub-information to be recorded that cannot be reproduced by apparatuses other than an apparatus that has performed recording.

In a conventional optical disk, in the case where contents delivered on a network are recorded on the optical disk, there is a possibility that media themselves, on which digital works are recorded, are distributed at low cost on a second-hand market, which is detrimental to the benefit of digital work distributors. However, according to this embodiment, by recording an encryption key of main information as sub-information, the above-mentioned problem can be solved.

Embodiments 1 and 2 described sub-information that was obtained by, according to the present invention, allowing a recording mark to be deformed slightly in accordance with a pseudo random number sequence related to medium inherent information or apparatus nullification information and thus nullified sub-information inherent to a medium or recording and reproduction of a specific apparatus. However, needless to say, the present invention is not limited to these embodiments.

For example, Embodiments 1 and 2 described the structure in which an edge in a tangential direction of a recording mark was displaced to a position advanced or delayed in accordance with a generated pseudo random number sequence so as to allow the recording mark to be deformed slightly, and thus sub-information was recorded. However, the present invention can be applied to techniques in which sub-information is recorded so that the sub-information is superimposed on main information in accordance with a pseudo random number sequence and the sub-information is recorded or reproduced based on a correlation with an equivalent pseudo random number sequence. In an example of such techniques, recording power is controlled in accordance with a pseudo random number sequence so as to allow a recording mark to be deformed slightly. In another example of the techniques, a laser beam is displaced in a radial direction in accordance with a pseudo random number sequence so as to perform radial modulation of a recording mark. In still another example of the techniques, a bit error of main information is caused in accordance with a pseudo random number sequence so as to record sub-information. In yet another example of the techniques, special modulation of main-information is performed in accordance with a pseudo random number sequence so as to record sub-information. Among the above-mentioned examples, the radial modulation of a recording mark performed by displacement of a laser bean in a radial direction in accordance with a pseudo random number sequence will be described below in Embodiment 4.

(Embodiment 4)

Figure 17:
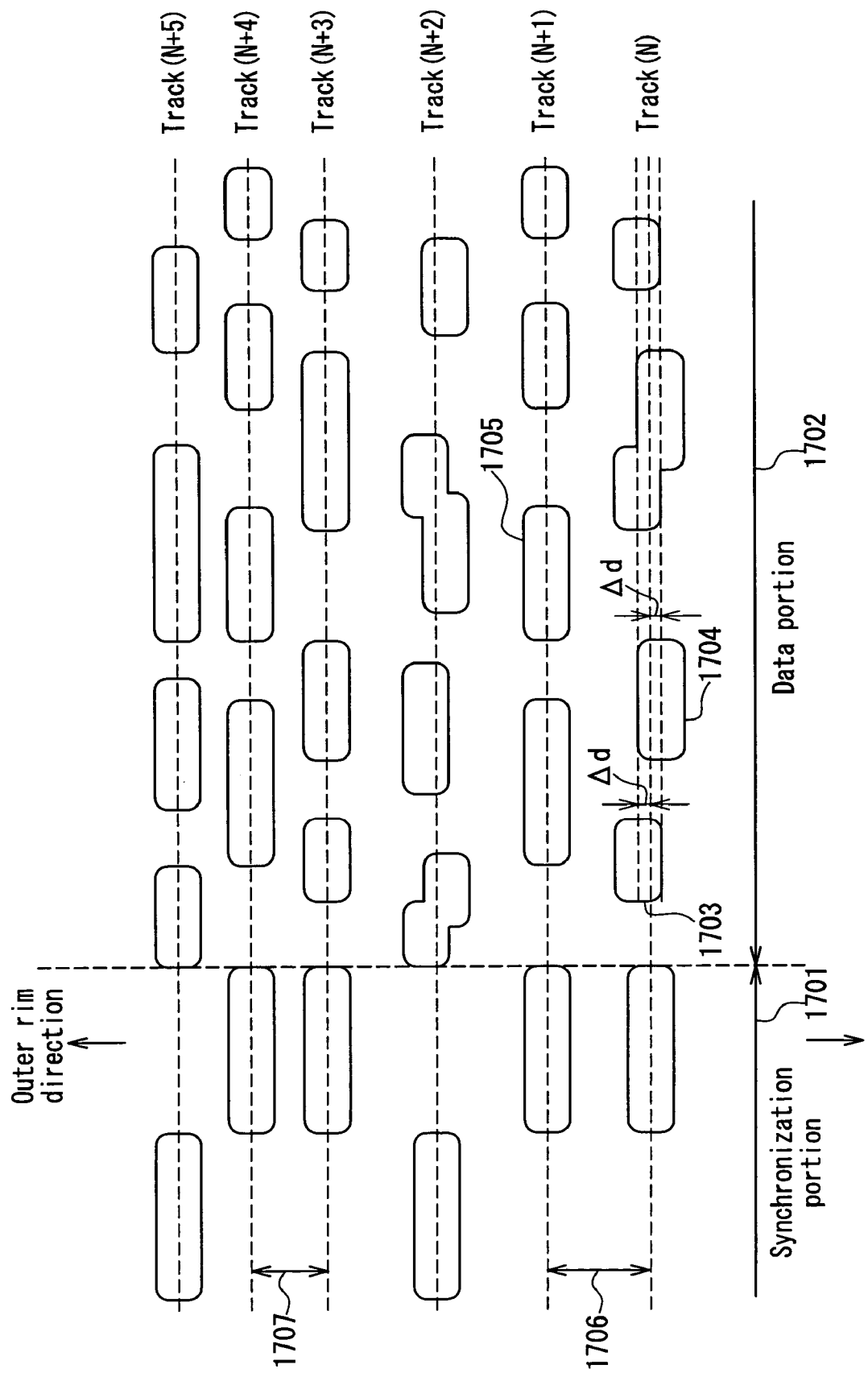
FIG. 17 is a diagrammatic view showing an example of recorded marks containing sub-information that are formed on an optical disk as an information recording medium according to Embodiment 4 of the present invention.

FIG. 17 is a diagrammatic view showing an example of recorded marks containing sub-information that are formed on an optical disk according to Embodiment 4 of the present invention. In FIG. 17, recorded marks are not displaced in a radial direction in a synchronization portion 1701, while in a track (N) of a data portion 1702, a recorded mark 1703 is displaced by Δr in an outer rim direction, and a recorded mark 1704 is displaced by Δr in an inner rim direction. The same also applies to a track (N+2).

Furthermore, in a track (N+1), a recorded mark 1705 is a frame to which disk inherent information is imparted and thus is not displaced in a radial direction. This also applies to a track (N+3), a track (N+4), and a track (N+5).

As shown in FIG. 17, a track pitch 1706 between a track (for example, the track (N)) in which a recorded mark is displaced in the radial direction of the optical disk and a track (for example, the track (N+1)) in which a recorded mark is not displaced is larger than a track pitch 1707 between tracks (for example, between the track (N+3) and the track (N+4)) in each of which a recorded mark is not displaced.

Figure 18:
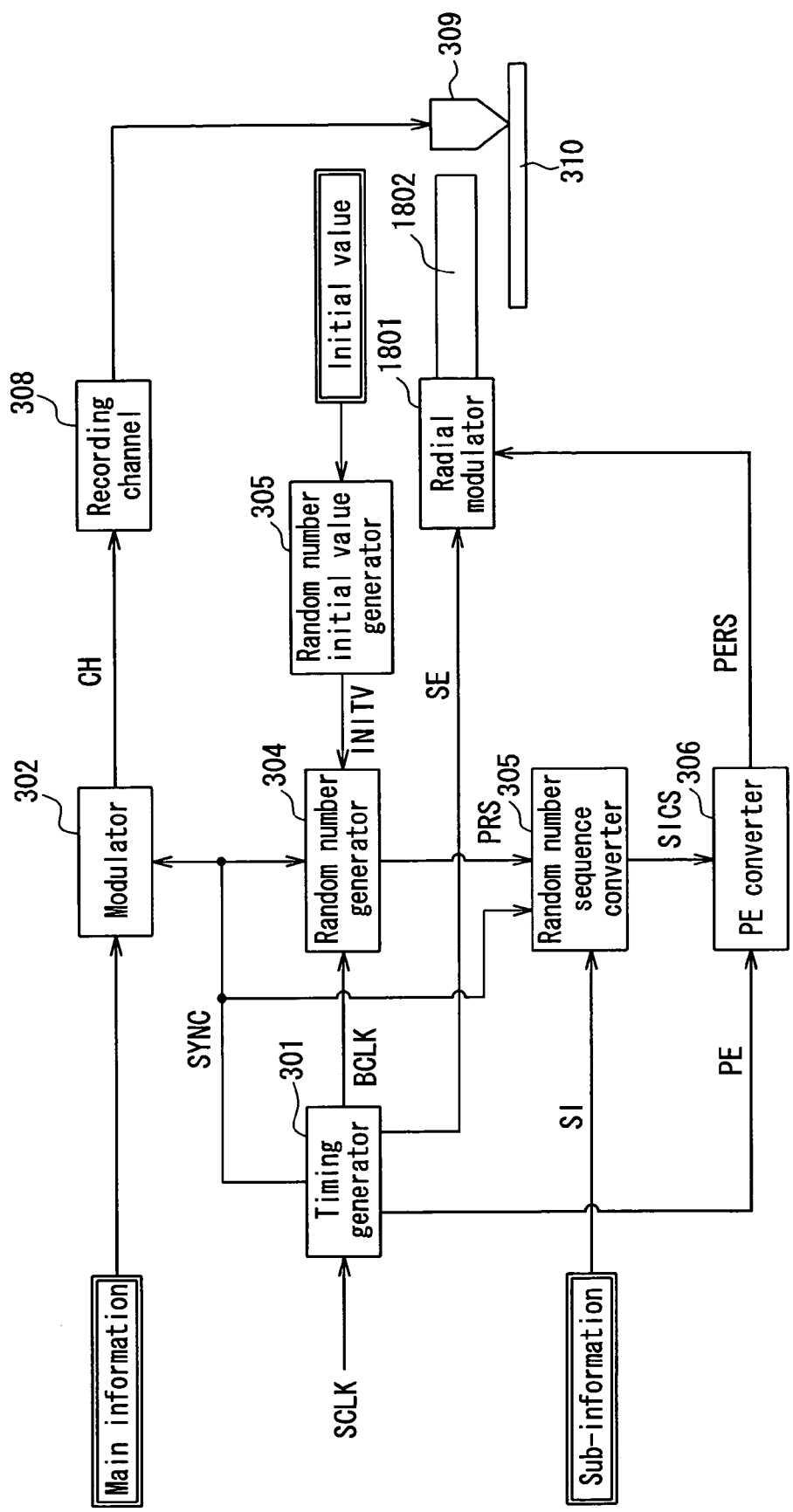
FIG. 18 is a block diagram showing an example of a configuration of an optical disk recording apparatus as an information recording apparatus according to Embodiment 4 of the present invention.

FIG. 18 is a block diagram showing an example of a configuration of an optical disk recording apparatus according to Embodiment 4 of the present invention. The optical disk recording apparatus according to this embodiment is different from Embodiment 1 shown in FIG. 3 in that the phase modulator 307 is removed whereas a radial modulator 1801 and an electrode 1802 are added. Other configurations and functions are the same as those shown in FIG. 3 and thus are denoted by like reference numerals with duplicate descriptions thereon omitted.

During a period of time when a displacement enabling signal (SE) outputted from a timing generator 301 is at the logic "H" level, in accordance with a logic level of a PE modulation random number sequence PERS outputted from a PE modulator 306, the radial modulator 1801 applies an analog displacement control voltage (ASC) that is a positive potential or a negative potential to the electrode 1802. According to this analog displacement control voltage ASC, the electrode 1802 displaces a recording beam outputted from a recording head 309 to an outer rim direction or an inner rim direction of an optical disk 310.

Figure 19:
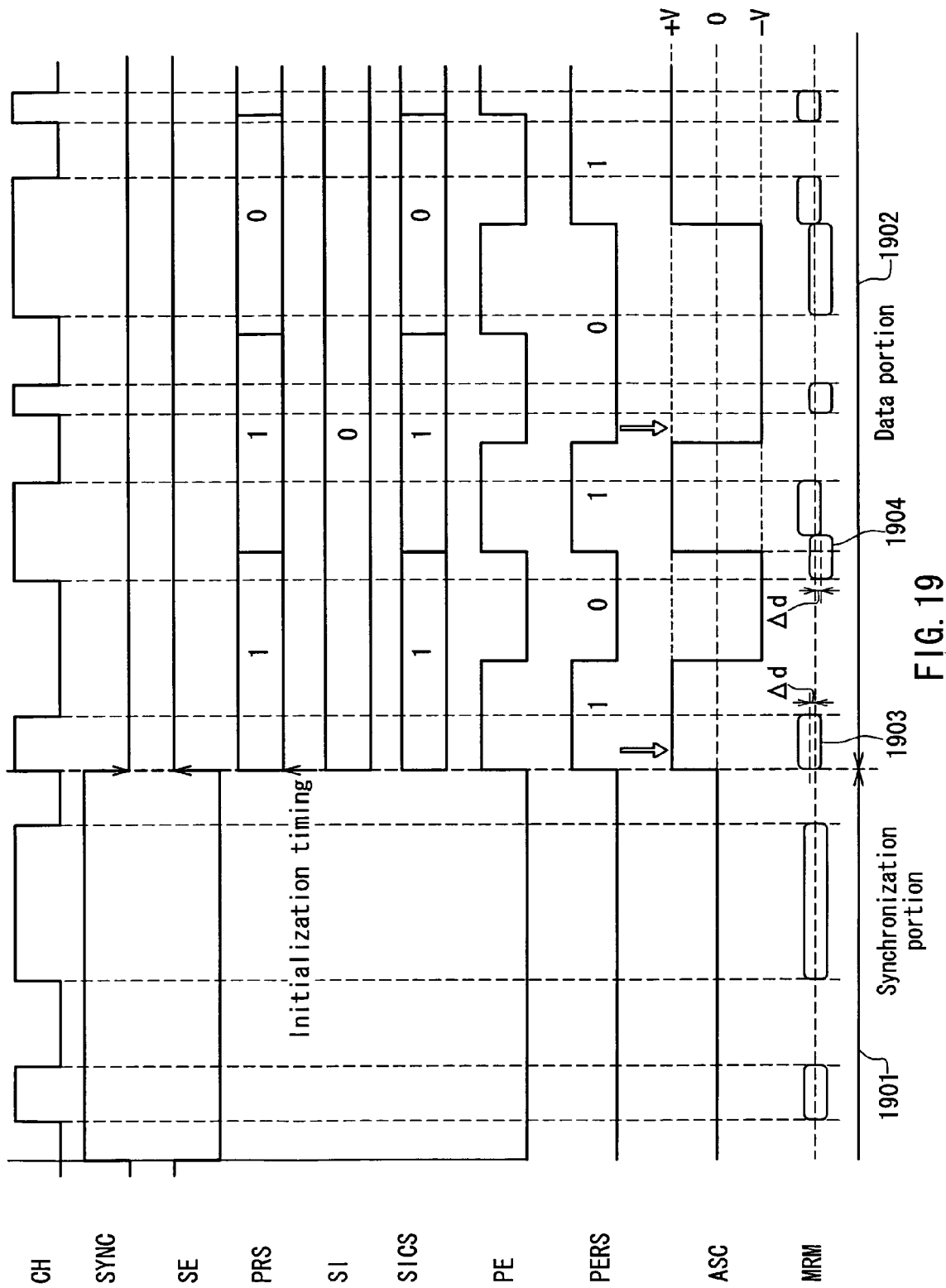
FIG. 19 is a timing chart for signals in respective portions when a recording mark containing sub-information is formed on an optical disk by the optical disk recording apparatus that is configured as in FIG. 18.

FIG. 19 is a timing chart for signals in respective portions when a recording mark containing sub-information is formed on an optical disk by the optical disk recording apparatus according to this embodiment. In FIG. 19, like names indicate like signals that are shown in FIG. 6 referred to in the description of Embodiment 1.

In FIG. 19, when switching from a synchronization portion 1901 to a data portion 1902 is detected by the timing generator 301, the displacement enabling signal SE attains the logic "H" level. In the case where the PE modulation random number sequence PERS outputted from the PE modulator 306 is "1", the radial modulator 1801 outputs a positive voltage (+V) as the analog displacement control voltage ASC. In this case, for example, a recording mark 1903 is formed so as to be displaced by Δd in the outer rim direction of the optical disk 310. In the case where the PE modulation random number sequence PERS is "0", the radial modulator 1801 outputs a negative voltage (−V) as the analog displacement control voltage ASC. In this case, for example, a recording mark 1904 is formed so as to be displaced by Δd in the inner rim direction of the optical disk 310.

Figure 20:
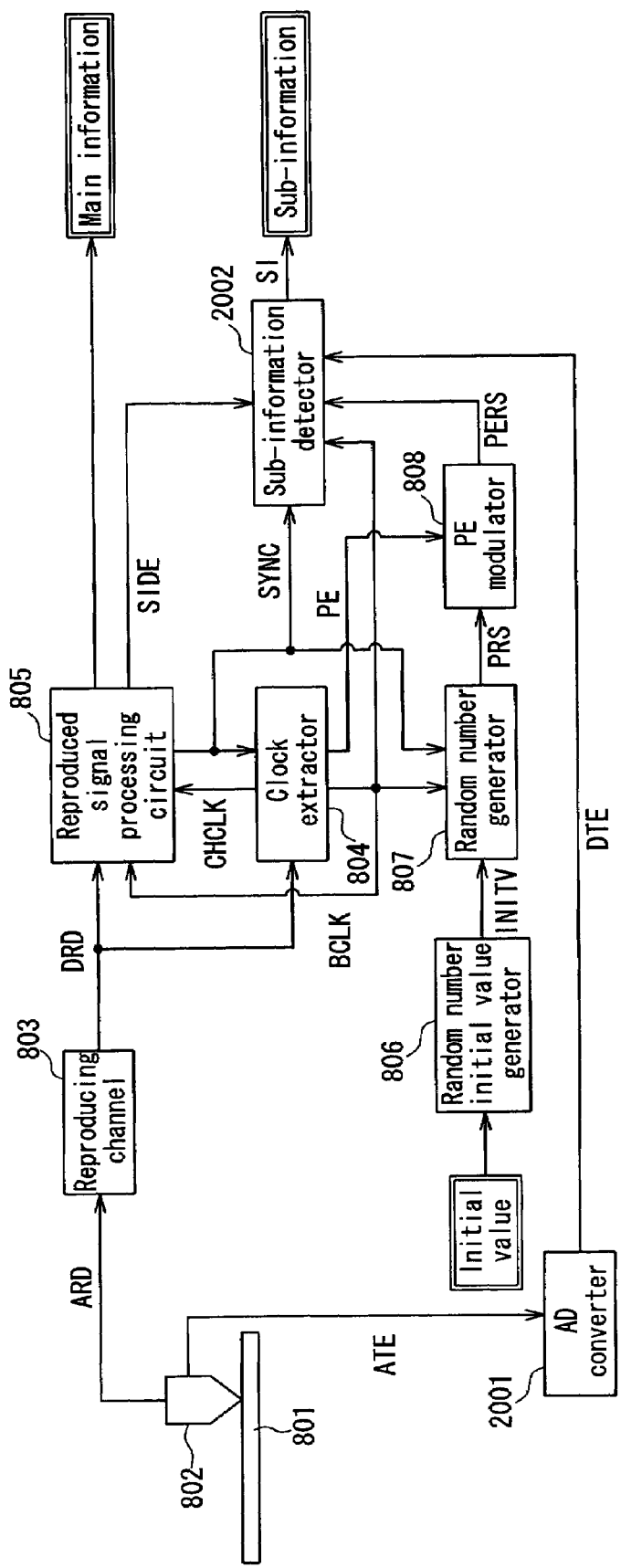
FIG. 20 is a block diagram showing an example of a configuration of an optical disk reproducing apparatus as an information reproducing apparatus according to Embodiment 4 of the present invention.

FIG. 20 is a block diagram showing an example of a configuration of an optical disk reproducing apparatus according to Embodiment 4 of the present invention. In Embodiment 1, as shown in FIG. 8, the leading phase error signal LEAD ERR and the lagging phase error signal LAG ERR were generated by the clock extractor 804, and by the sub-information detector 809, a correlation was established between the PE modulation random number sequence PERS and each of the leading phase error signal LEAD ERR and the lagging phase error signal LAG ERR so as to detect sub-information by slight displacement of an edge in a tangential direction of a recorded mark. In contrast to this, in a configuration according to this embodiment, an analog TE (Tracking Error) signal (ATE) read out from a reproducing head 802 is converted into a digital TE signal (DTE) by an AD converter 2001. By a sub-information detector 2002, an outer rim side displacement signal and an inner rim side displacement signal of a recorded mark are extracted from the digital TE signal DTE. A correlation is established between the PE modulation random number sequence PERS and each of these outer rim side displacement signal and the inner rim side displacement signal so as to detect sub-information by displacement of the recorded mark itself in a radial direction.

Figure 21:
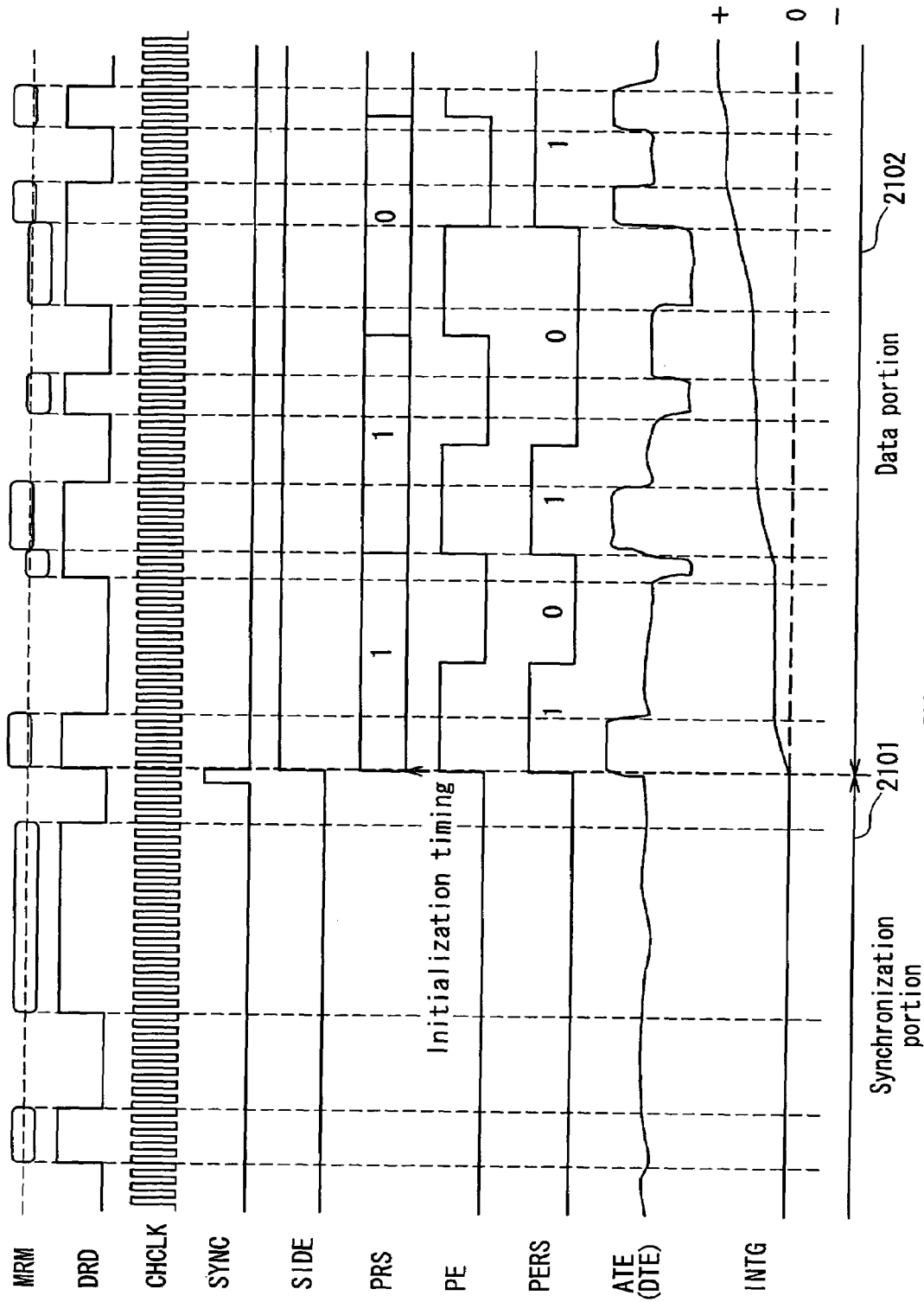
FIG. 21 is a timing chart for signals in respective portions when sub-information is reproduced from a recorded mark on an optical disk by the optical disk reproducing apparatus that is configured as in FIG. 20.

FIG. 21 is a timing chart for signals in respective portions when sub-information is reproduced from a recorded mark on an optical disk by the optical disk reproducing apparatus according to this embodiment. In FIG. 21, like names indicate like signals that are shown in FIG. 11 referred to in the description of Embodiment 1.

In FIG. 21, when switching from a synchronization portion 2101 to a data portion 2102 is detected by a reproduced signal processing circuit 805, a sub-information detection enabling signal SIDE attains the logic "H" level. In the case where a PE modulation random number sequence PERS outputted from a PE modulator 808 is "1" and a digital TE signal DTE indicates an outer rim direction displacement signal, or the PE modulation random number sequence PERS is "0" and the digital TE signal DTE indicates an inner rim direction displacement signal, an output voltage INTG of an integrator included in the sub-information detector 2002 increases to exceed a positive threshold value. Thus, the logic "L" level is detected as sub-information.

Though not shown in FIG. 21, in the case where the PE modulation random number sequence PERS is "1" and the digital TE signal DTE indicates an inner rim direction displacement signal, or in the case where the PE modulation random number sequence PERS is "0" and the digital TE signal DTE indicates an outer rim direction displacement signal, the output voltage INTG of the integrator included in the sub-information detector 2002 decreases to exceed a negative threshold value. Thus, the logic "H" level is detected as sub-information.

In each of the above-described embodiments, main information is not limited to an optically readable recording mark, and a structure in which the main information is read out using a magnetic force, heat or the like also is possible.

Furthermore, by combining Embodiment 1 with Embodiment 2, it is possible to record sub-information that is inherent in a medium, disables illegal duplication between media, and nullifies recording and reproduction of the sub-information by a specific apparatus. This can be achieved by a method in which a pseudo random number sequence inherent in a medium and a pseudo random number sequence that allows nullification are recorded while being switched with respect to every unit area in which sub-information is to be recorded (for example, a sector unit, a frame unit, an ECC (Error Correction Code) block unit, a track unit). Alternatively, this can be achieved also by, for example, as in a DVD-RAM, using a pseudo random number sequence related to a medium key generated as a result of an apparatus nullification process and a medium inherent key generated from disk inherent identification information that is medium inherent information.

Furthermore, Embodiment 1 described the structure in which medium inherent information was used in an as-is state as an in initial value of a pseudo random number sequence. However, a structure also is possible in which a result of encryption of medium inherent information or a bit operation such as bit extension, bit shortening, bit scrambling or the like is used as an initial value. Similarly, Embodiment 2 used a contents encryption key (medium key) in an as-is state as an initial value of a pseudo random number sequence. However, a structure also is possible in which a result of encryption of a contents encryption key or a bit operation such as bit extension, bit shortening, bit scrambling or the like is used as an initial value.

As discussed in the foregoing description, according to the present invention, even if main information and sub-information are duplicated from an information recording medium, on which an encryption key of digital contents to be recorded is recorded as sub-information, entirely to another information recording medium, the sub-information cannot be reproduced from the another information recording medium, so that it is possible to suppress reproduction of the duplicated digital contents.

Furthermore, in the case where an initial value is publicized in a given apparatus, recording and reproduction of sub-information by the apparatus can be nullified.

The invention claimed is:

1. An information recording medium in which a recording mark is formed as main information by switching a signal level at a predetermined interval of a reference signal,
    wherein sub-information is recorded so as to be superimposed on the main information by deformation of a shape or a pattern of the recording mark or positional displacement of the recording mark in accordance with the sub-information, the sub-information being subjected to data conversion based on apparatus nullification information that has been recorded in advance on the information recording medium.

2. The information recording mediun according to claim 1,
    wherein the data conversion is data scrambling of the sub-information in accordance with a pseudo random number sequence that is generated using the apparatus nullification information as an initial value.

3. The information recording medium according to claim 2,
    wherein the data conversion further is data scrambling of the sub-information in accordance with a pseudo random number sequence that is generated using as an initial value medium inherent information of the information recording medium that has been recorded in advance on the information recording medium.

4. The information recording medium according to claim 3,
    wherein in recording the sub-information, the sub-information is subjected to data scrambling in which the pseudo random number sequence that is generated using the apparatus nullification information as an initial value and the pseudo random number sequence that is generated using the medium inherent information as an initial value are switched with respect to every predetermined recording unit that is any one of a frame unit including a synchronization code of the main information, a sector unit including address information, and a block unit encoded into an error-correction code.

5. The information recording medium according to claim 1,
    wherein the data conversion is data scrambling of the sub-information in accordance with a pseudo random number sequence that is generated using as an initial value an encryption key of the main information obtained using the apparatus nullification information.

6. The information recording medium according to claim 5,
    wherein the encryption key is a medium inherent key obtained based on the apparatus nullification information and medium inherent information of the information recording medium that has been recorded in advance on the information recording medium.

7. The information recording medium according to claim 1,
    wherein the apparatus nullification information is an encryption key set for encrypting the main information of the information recording medium.

8. An information recording apparatus, comprising:
    a main information recording unit that records, in synchronization with a predetermined reference signal, main information by forming a recording mark at discrete reference positions on an information recording medium;
    a data converting unit that subjects sub-information to data conversion based on apparatus nullification information that has been recorded in advance on the information recording medium; and
    a sub-information recording unit that records the sub-information so that the sub-information is superimposed on the main information by deformation of a shape or a pattern of the recording mark or positional displacement of the recording mark, based on the sub-information subjected to the data conversion by the data converting unit.

9. The information recording apparatus according to claim 8,
    wherein the data converting unit subjects the sub-information to data scrambling in accordance with a pseudo random number sequence that is generated using as an initial value an encryption key of the main information obtained using the apparatus nullification information.

10. The information recording apparatus according to claim 9,
wherein the encryption key of the main information is a medium inherent key obtained based on the apparatus nullification information and medium inherent information of the information recording medium that has been recorded in advance on the information recording medium.

11. The information recording apparatus according to claim 8,
wherein the data converting unit performs data scrambling of the sub-information in accordance with a pseudo random number sequence that is generated using the apparatus nullification information as an initial value.

12. The information recording apparatus according to claim 11,
wherein the data conversing unit further performs data scrambling of the sub-information in accordance with a pseudo random number sequence that is generated using as an initial value medium inherent information of the information recording medium that has been recorded in advance on the information recording medium.

13. The information recording apparatus according to claim 12,
wherein the data converting unit subjects the sub-information to data scrambling in which the pseudo random number sequence that is generated using the apparatus nullification information as an initial value and the pseudo random number sequence that is generated using the medium inherent information as an initial value are switched with respect to every predetermined recording unit that is any one of a frame unit including a synchronization code of the main information, a sector unit including address information, and a block unit encoded into an error-correction code.

14. An information reproducing apparatus, comprising:
a main information reproducing unit that reproduces main information from a recorded mark having a length that is an integral multiple of a discrete reference interval on an information recording medium;
a clock extracting unit that extracts a clock that is synchronized with the reference interval from a reproduced signal obtained when the recorded mark is reproduced;
a random number sequence generating unit that reads out apparatus nullification information that has been recorded in advance on the information recording medium and generates a pseudo random number sequence based on the apparatus nullification information; and
a sub-information reproducing unit that reproduces sub-information based on the reproduced signal reproduced by the main information reproducing unit, the clock extracted by the clock extracting unit, and the pseudo random number sequence generated by the random number sequence generating unit.

15. The information reproducing apparatus according to claim 14,
wherein the random number sequence generating unit generates the pseudo random number sequence using as an initial value an encryption key of the main information obtained using the apparatus nullification information.

16. The information reproducing apparatus according to claim 15,
wherein the encryption key of the main information is a medium inherent key obtained based on the apparatus nullification information and medium inherent information of the information recording medium that has been recorded in advance on the information recording medium.

17. The information reproducing apparatus according to claim 14.
wherein the random number sequence generating unit generates the pseudo random number sequence using the apparatus nullification information as an initial value.

18. The information reproducing apparatus according to claim 17,
wherein the random number sequence generating unit generates the pseudo random number sequence further using as an initial value medium inherent information of the information recording medium that has been recorded in advance on the information recording medium.

19. The information reproducing apparatus according to claim 18,
wherein the random number sequence generating unit switches between the pseudo random number sequence that is generated using the apparatus nullification information as an initial value and the pseudo random number sequence that is generated using the medium inherent information as an initial value with respect to every predetermined recording unit that is any one of a frame unit including a synchronization code of the main information, a sector limit including address information, and a block unit encoded into an error-correction code.

* * * * *

UNITED STATES PATENT AND TRADEMARK OFFICE
CERTIFICATE OF CORRECTION

PATENT NO. : 7,196,994 B2 Page 1 of 1
APPLICATION NO. : 10/531810
DATED : March 27, 2007
INVENTOR(S) : Yamaoka et al.

It is certified that error appears in the above-identified patent and that said Letters Patent is hereby corrected as shown below:

Column 25, line 64(claim 2): "recording mediun" should read --recording medium--.
Column 27, line 18(claim 12): "data conversing unit" should read --data converting unit--.

Signed and Sealed this

Ninth Day of October, 2007

JON W. DUDAS
*Director of the United States Patent and Trademark Office*